United States Patent [19]

Kolker et al.

[11] 4,095,248

[45] June 13, 1978

[54] REDUNDANCY REDUCTION SYSTEM FOR FACSIMILE TRANSCEIVERS

[75] Inventors: Carl R. Kolker, San Gabriel; John Scott Campbell, Pasadena, both of Calif.; Robert L. La Fond, New York, N.Y.; JaMi Smith, Monrovia, Calif.

[73] Assignee: Faxon Communications Corporation, Pasadena, Calif. ; by said Kolker, Campbell and LaFond

[21] Appl. No.: 696,744

[22] Filed: Jun. 16, 1976

[51] Int. Cl.² .............................................. H04N 3/34
[52] U.S. Cl. ..................................... 358/288; 358/260
[58] Field of Search ........................ 358/288, 260, 261

[56] References Cited

U.S. PATENT DOCUMENTS

| | | | |
|---|---|---|---|
| 3,366,734 | 1/1968 | Jurk | 358/288 |
| 3,502,803 | 3/1970 | Bigenwald | 358/288 |
| 3,643,016 | 2/1972 | Dattilo | 358/288 |
| 3,646,256 | 2/1972 | Jacob | 358/288 |
| 3,730,988 | 5/1973 | Shimizu | 358/288 |
| 3,955,045 | 5/1976 | Ford | 358/288 |

Primary Examiner—Howard W. Britton

[57] ABSTRACT

A facsimile transmitter-receiver system which is adapted for use over a limited band width transmission path employs a redundancy reduction unit to speed-up transmission time by rapidly sweeping the transmitters single scanning beam in full or partial search passes across proposed data free areas of a source document. In the horizontal direction a transition to partial fast search during a horizontal pass is made beyond a proposed right hand data boundary and is accompanied by a one line space temporary downward deflection or bias of the scanning beam, which facilitates search for new data boundaries and also permits the system to make a slow scan retrace of a line (by eliminating the bias whenever data is actually found in the search pass). Fast search in the vertical direction is effected by two related methods: (1) The use of a wide search pass in which the scanning beam is effectively widened during a horizontal pass, preferably by zigzagging the beam up and down with a simple vertical modulation which is many lines wide and; (2) By thereafter sufficiently increasing the spacings between successive wide search passes of the scanning beam so that each successive wide search pass is only slightly overlapped with the bottom of the preceding wide search pass. Major data free areas in the horizontal direction are therefore scanned at a much higher velocity than are data filled areas; and major data free areas in a vertical direction are scanned with many fewer passes of the wide search scanning beam. A major speed-up in transmission speed and consequent reduction in time and cost of transmission is thereby obtained.

50 Claims, 11 Drawing Figures

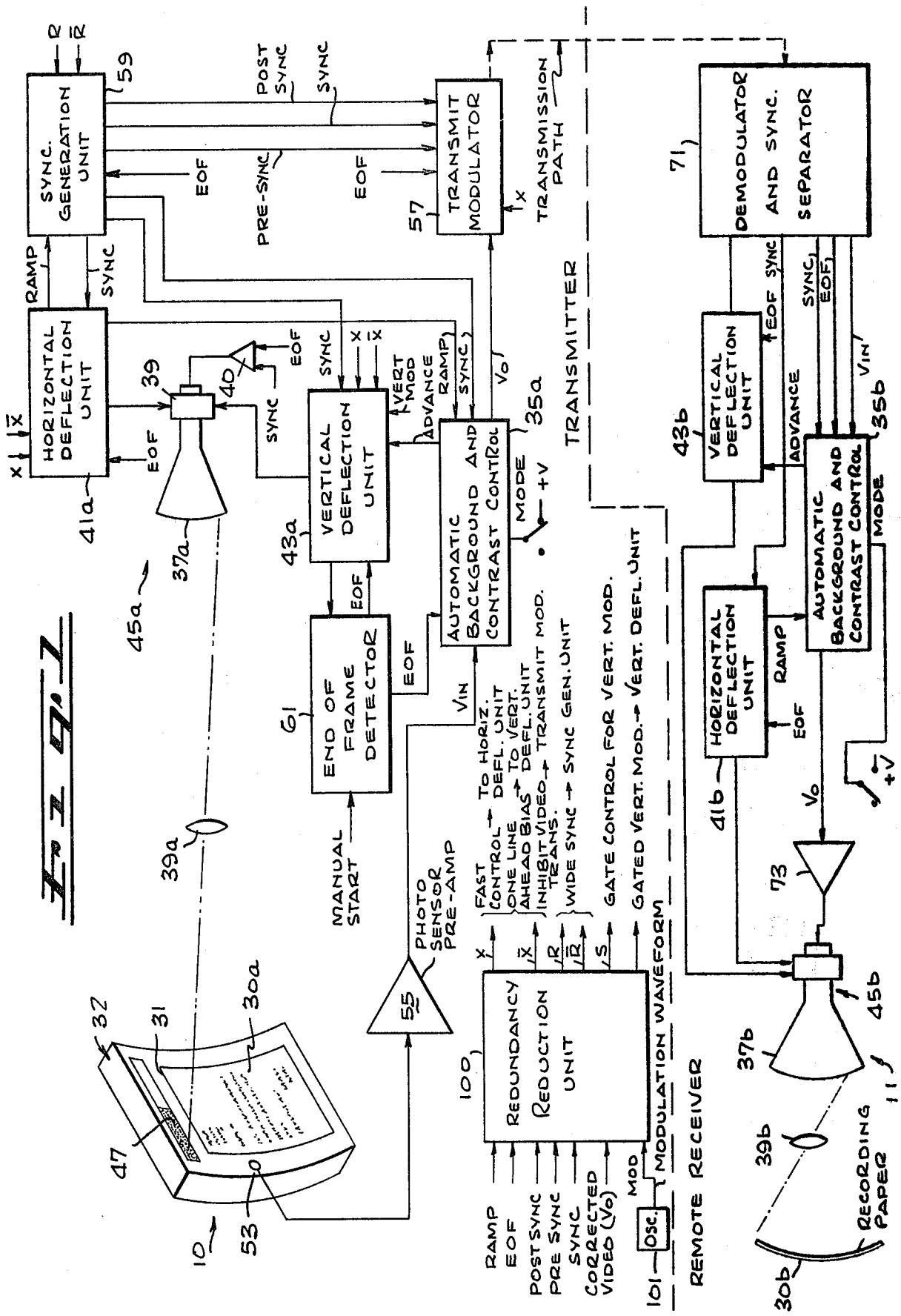

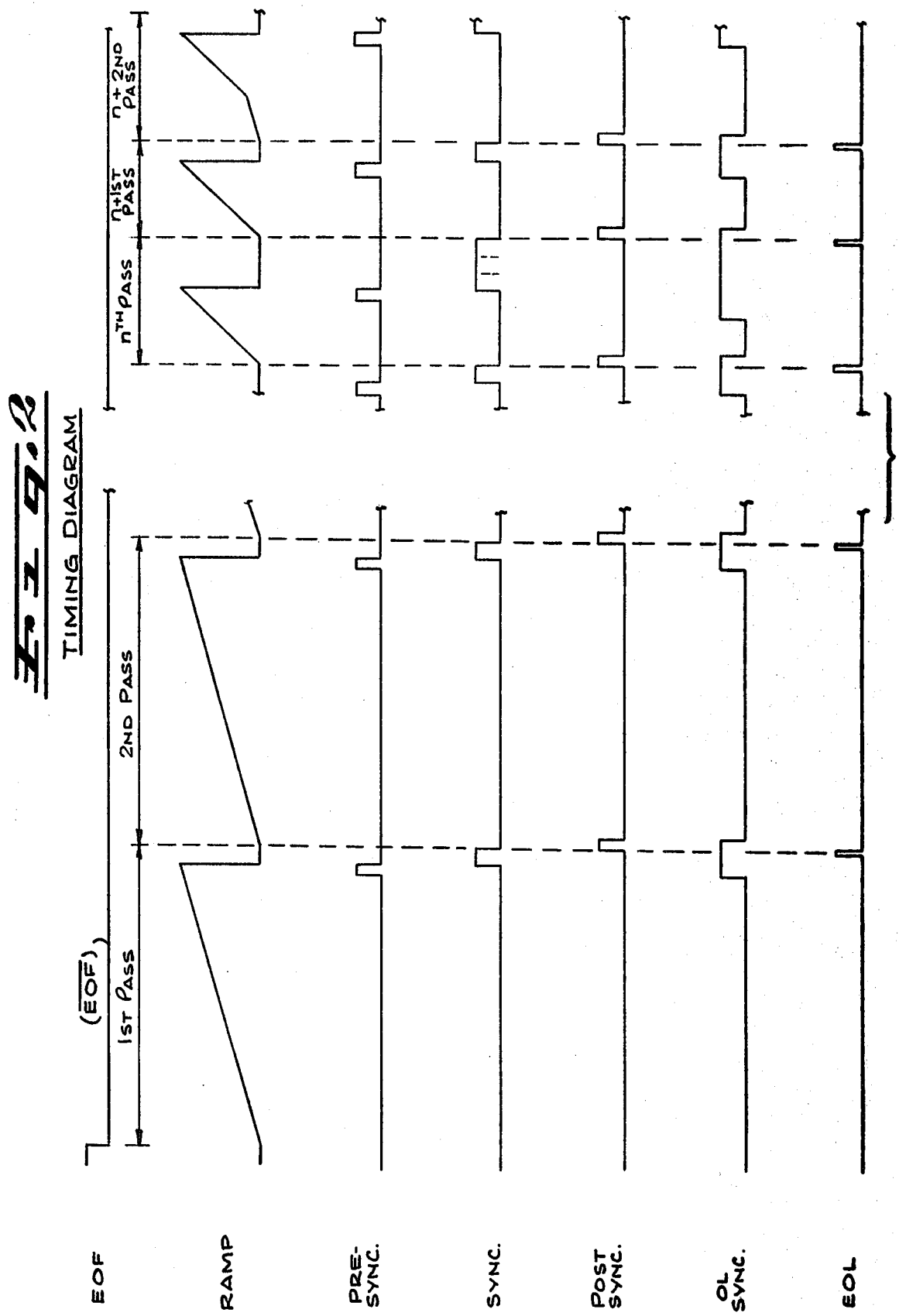

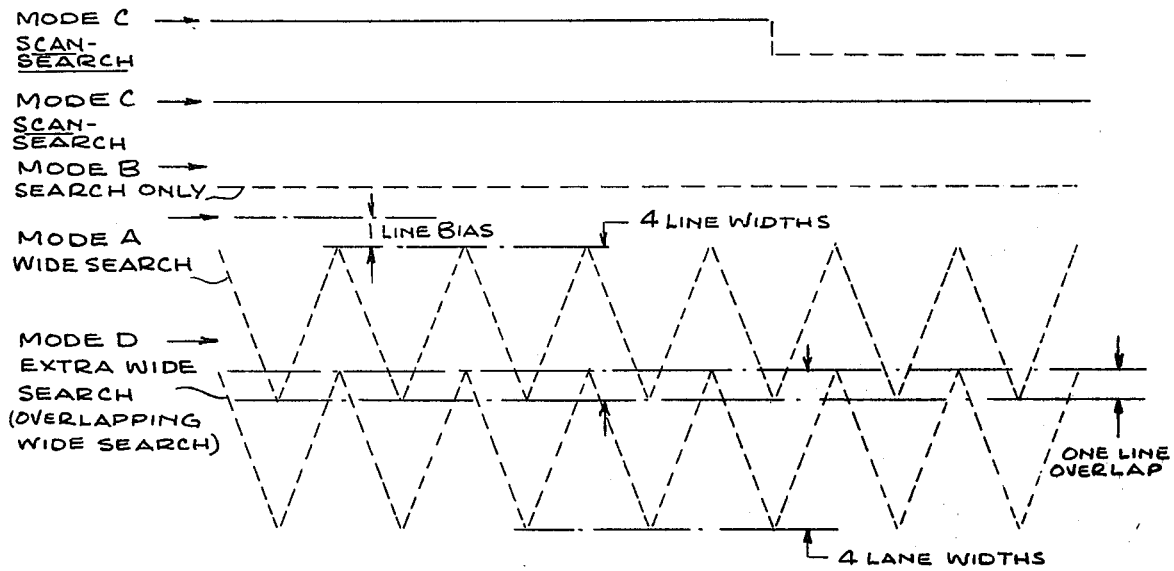
Fig. 3 MODES OF OPERATION OF TRANSMITTER SCANNING BEAM
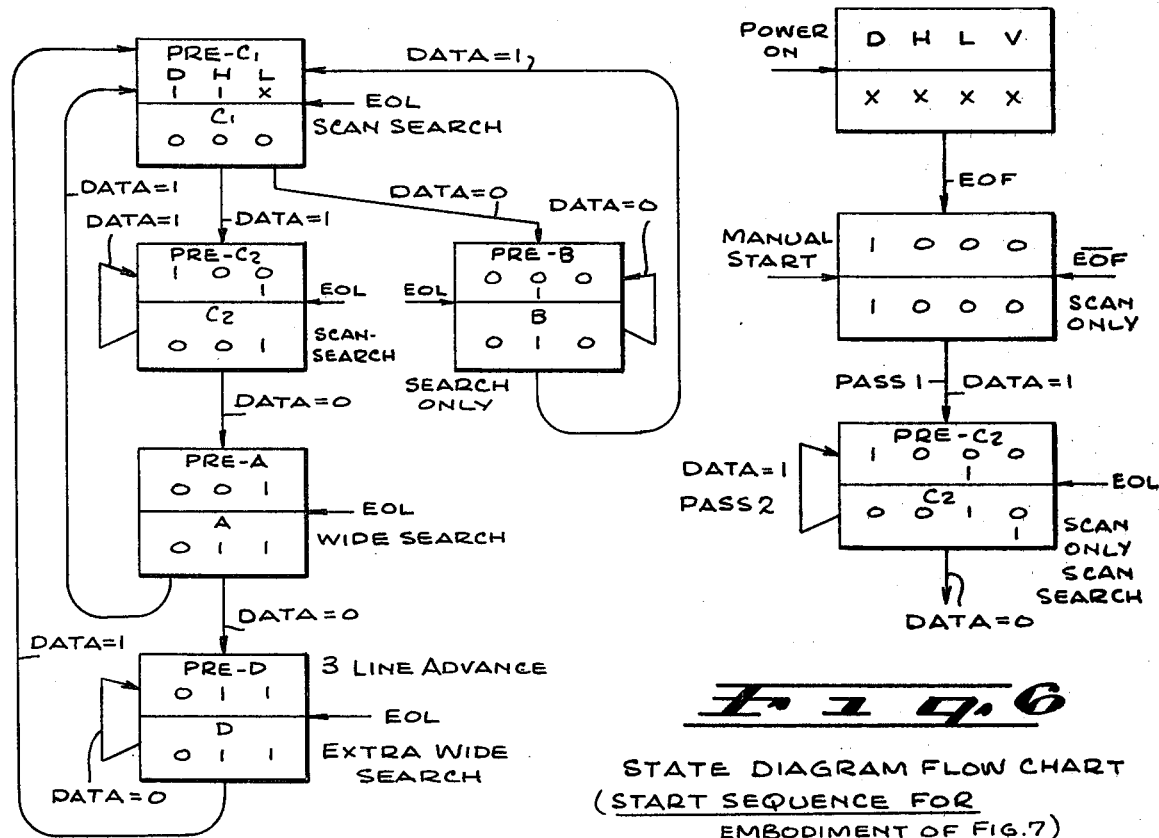
Fig. 5 STATE DIAGRAM FLOW CHART (NORMAL SEQUENCE FOR EMBODIMENT OF FIG. 7)
Fig. 6 STATE DIAGRAM FLOW CHART (START SEQUENCE FOR EMBODIMENT OF FIG. 7)

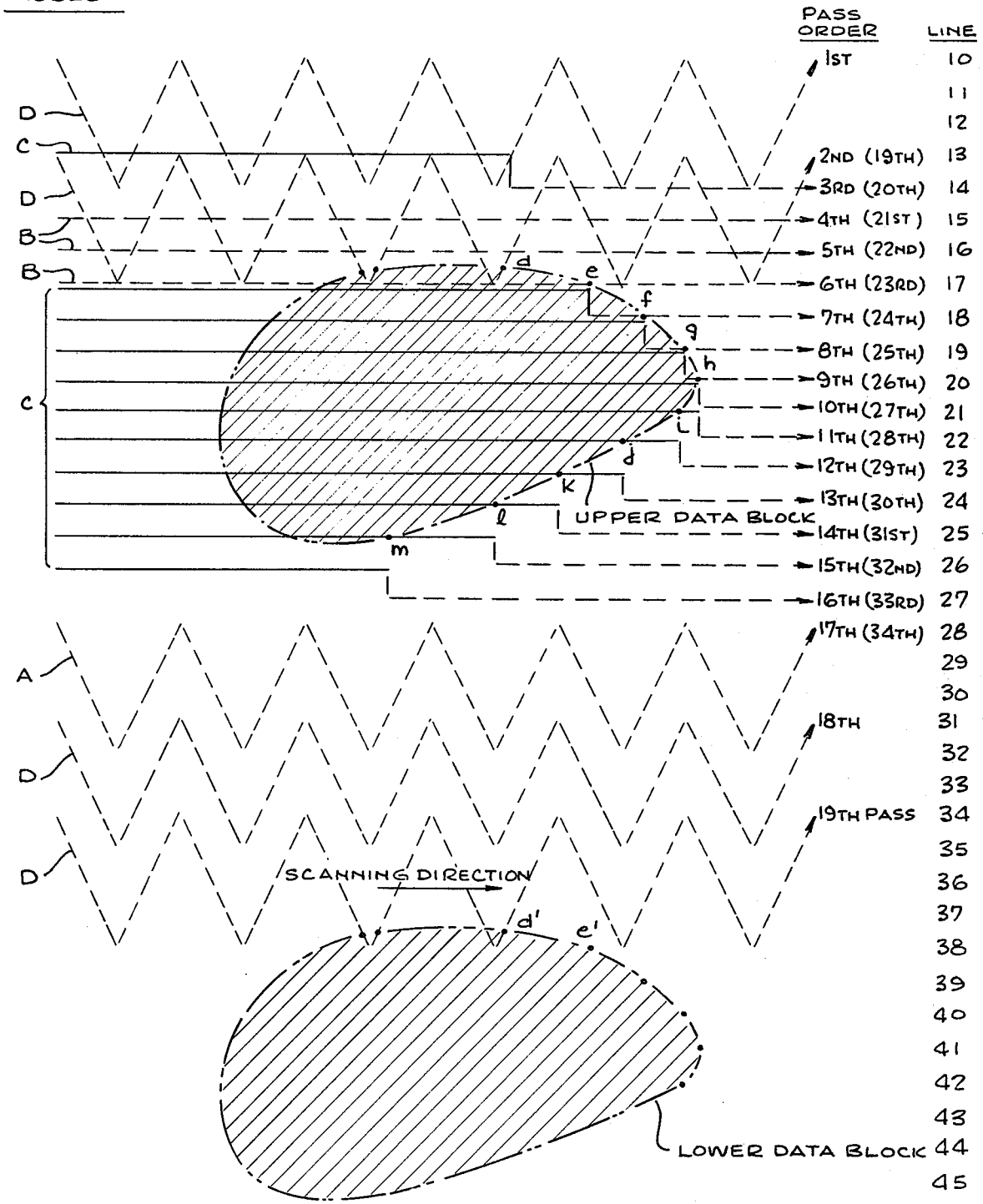

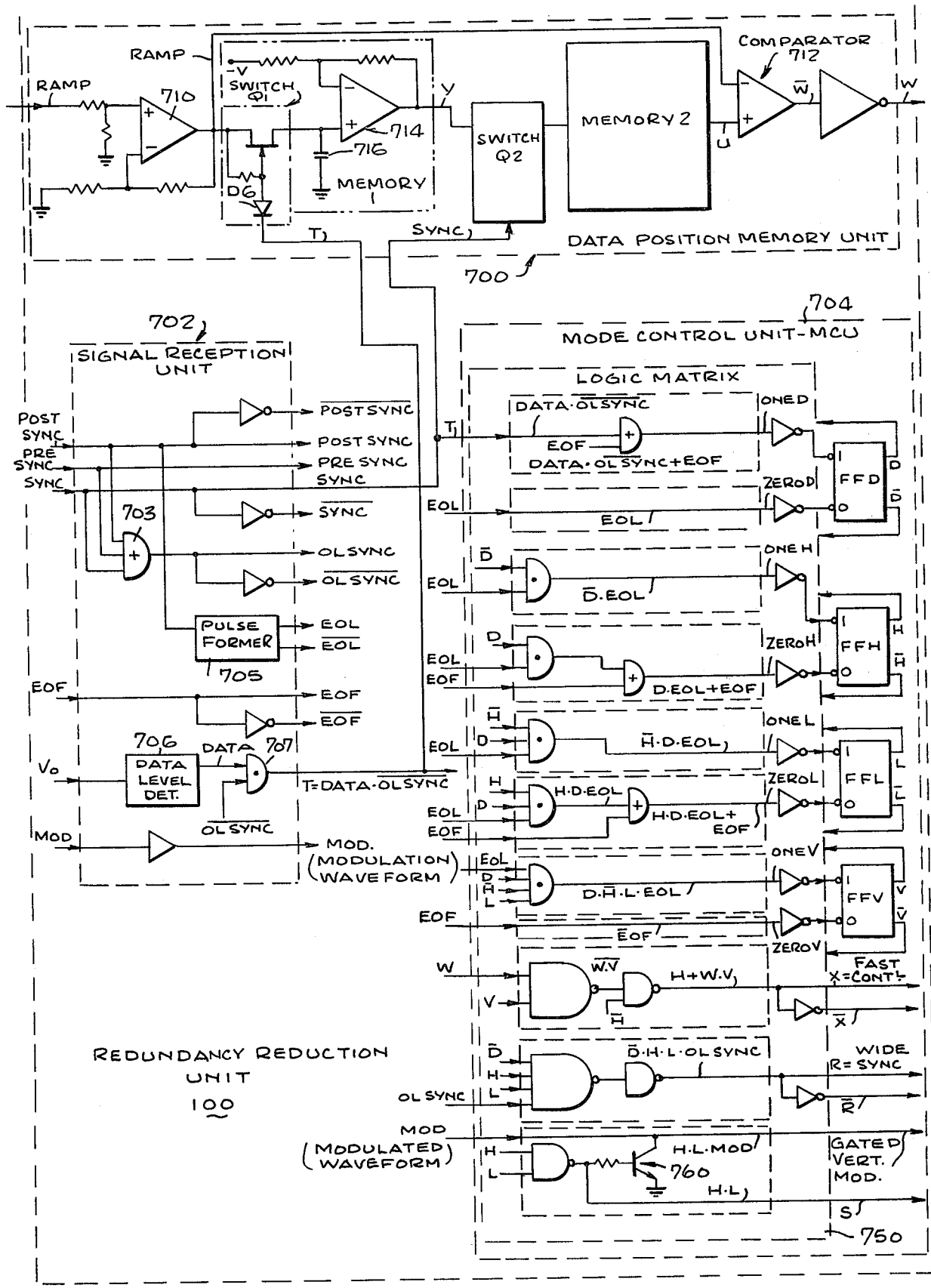

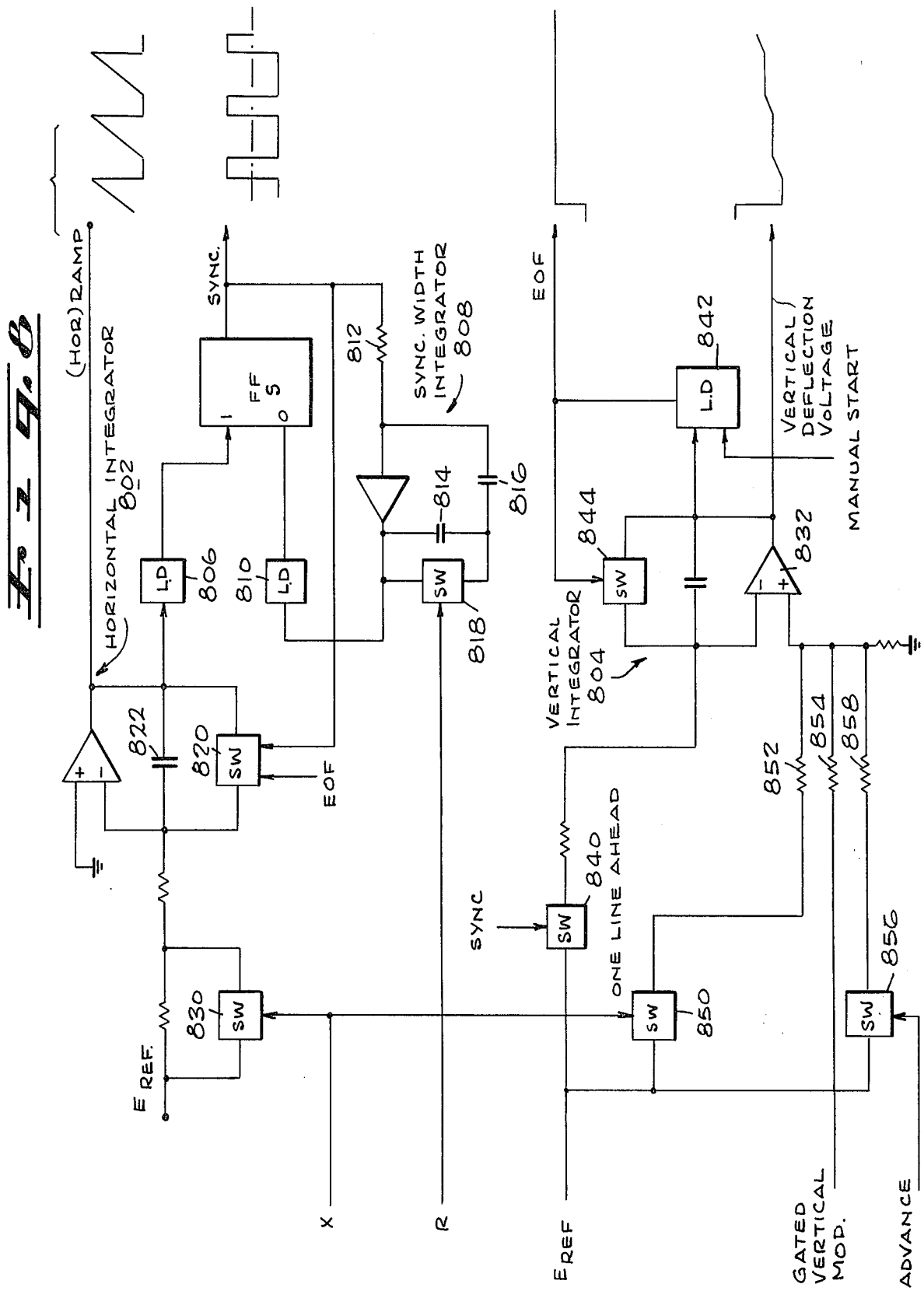

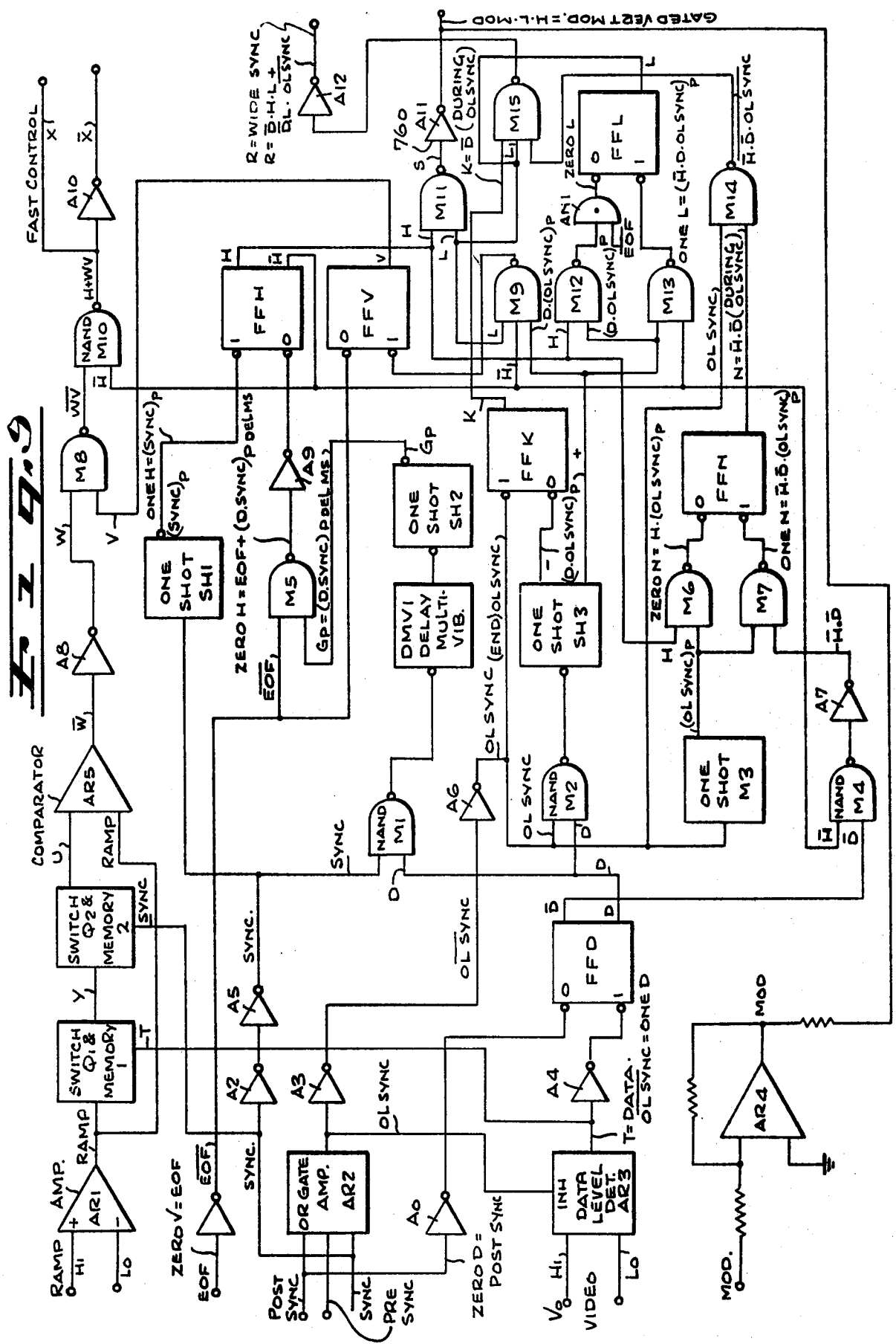

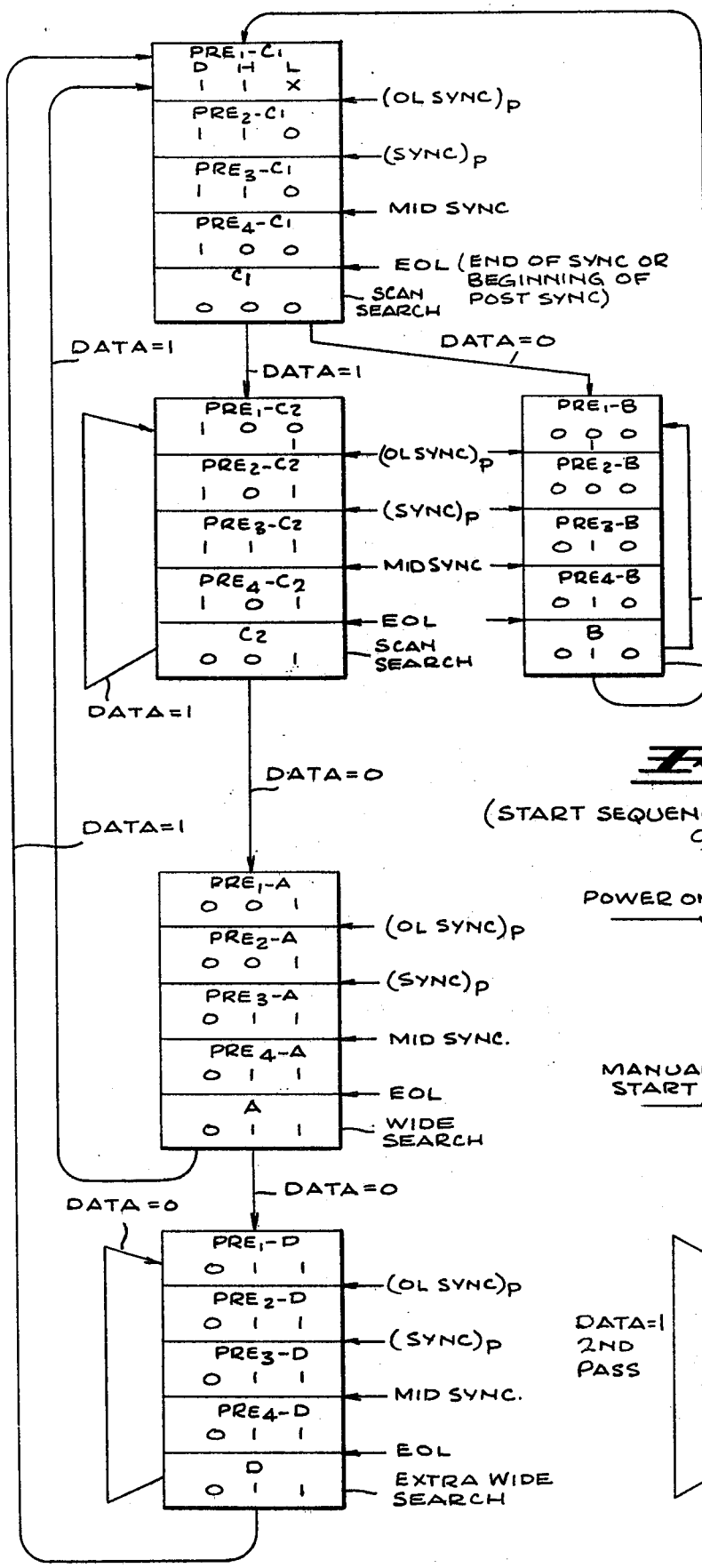

REDUNDANCY REDUCTION SYSTEM FOR FACSIMILE TRANSCEIVERS

BACKGROUND OF THE INVENTION

1. Field of the Invention

This invention relates generally to a redundancy reduction system for a facsimile transmitter-receiver or similar device which uses the scanning beam or element of the transmitter, in its passes across a source document, to detect and store in memory the position of boundaries between data areas of the document and major data-free areas, this stored information being used by the redundancy reduction system to order very fast search of the proposed data-free areas, with accompanying suppression during such search operations of video data transmission to the remote facsimile receiver. This accomplishes a very high order of redundancy reduction by effectively rapidly passing over and skipping transmission of major data free areas, with a resultant reduction of time of use of expensive transmission path facilities.

The present application is related to a co-pending patent application by one of the present inventors, entitled METHODS AND APPARATUS FOR AUTOMATIC BACKGROUND AND CONTRAST CONTROL, now U.S. Pat. No. 3,952,144, Ser. No. 511,422 filed Oct. 2, 1974 by Carl R. Kolker, and assigned to the assignee of the present application. The present application is also related to an issued U.S. Pat. No. 3,843,839 issued Oct. 22, 1974 by Campbell, et al., and also assigned to the assignee of the present application. Both the related Campbell, et al., patent and the related Kolker patent application describe an exemplary facsimile transmission and receiving system in which a source document, whose contents are to be transmitted from a facsimile transmitter to a remote facsimile receiver and reproducer, is scanned line by line, by a narrowly focused light beam which illuminates the document areas being scanned. The light reflected from the scanned document areas is collected by a suitable photo-sensor which is positioned adjacent to the document to produce a corresponding signal which is representative of the shade of darkness or lightness of the document area being scanned at that instant. This video signal is then applied as one input signal to a suitable transmit modulator, which also receives a variety of synchronizing pulses provided by other elements of the facsimile transmitter and operates to transmit both the video information and the synchronizing signal information by a suitable modulation system (as for example by frequency modulation or PCM, etc.) over a transmission path, such as telephone lines or a radio transmission path, to the remote facsimile receiver. The signals which are received over the transmission path by the facsimile receiver, are first processed in a suitable demodulator which extracts both the video portion of the signal and also the synchronizing pulse portions of the signal, and produces a corresponding video input signal and synchronizing pulse signals for use by the receiver. The demodulated video signal is applied as an input to writing means in the facsimile receiver and is applied, for example, to control the intensity of a light beam produced by a flying spot recorder which writes upon a photosensitive recording medium to reproduce thereon the image being scanned by the reading light beam of the facsimile transmitter. The synchronizing pulses extracted by the demodulator of the receiver are applied to the writing apparatus of the receiver to control the positioning of the writing means and are applied, for example, to the vertical and horizontal deflection controls of the receiver to synchronize the horizontal and vertical scans of the writing beam of the receiver so as to illuminate at any time recording areas corresponding to the source document areas then being scanned in the transmitter.

A facsimile transceiver system as described above is disclosed in the Campbell, et al., Pat. No. 3,843,839. An additional module, an Automatic Background and Contrast Control Unit, which may be used with the facsimile system, is disclosed in detail in the co-pending Kolker U.S. Pat. No. 3,952,144. The Automatic Background and Contrast Control Unit corrects the video signal produced by the photosensor for undesired biases, drifts and voltage offsets arising from a variety of sources, and also normalizes the video signal so that it accurately and uniformly represents the full black to white contrast range of the document. The Automatic Background and Contrast Control Unit obtains the information which it needs for such normalizing operations from preliminary calibration scans in which the transmitter automatically makes two scans of a half black-half white calibration strip which is provided on the transmitter target face above the normal source document area. After the initial calibration scans are completed, the Automatic Background and Contrast Control Unit issues a special ADVANCE signal to the vertical deflection unit of the transmitter which has the effect of deflecting the scanning beam down from the calibration strip into the source document area to thereby begin normal line-by-line scanning operations of the areas of the source document. As described in the co-pending Kolker application and in the issued Campbell, et al., patent, such scanning operations of the source document are normally conducted in a uniform and sequential manner, the transmitter making a line-by-line scan at constant horizontal deflection speed across the whole face of the source document and the receiver slavishly following and duplicating these same line-by-line scans on the recording surface on which the source document is to be reproduced in the receiver.

Such uniform transmission on a line-by-line basis of all areas of the source document is relatively slow for the reason that the maximum useable horizontal deflection speed of the transmitter scanning beam is limited by the band width capability of the transmission path utilized between the transmitter and the receiver. This is especially true with narrow band transmission paths such as phone lines and to a certain extent, conventional commercial radio channels. Transmission time over commercial transmission paths is very expensive and as a result, the relatively slow speed of transmission of a facsimile system of the type described is directly reflected in a corresponding relatively high cost of message transmission.

The present application is concerned with another system (and corresponding module) which may be used with the bacis facsimile transmit-receiver system. The added module is called a Redundancy Reduction Unit and provides a very major speed-up of transmission time by using information available in the transmitter to sense and locate boundaries between data filled areas of the document and probable major data free areas of the document and in accordance with such sensing to provide the transmitter with a number of fast search modes in which the transmitter very rapidly sweeps its scanning bean in a search pass across proposed data free areas while simultaneously suppressing all transmission of corresponding video data to the receiver during such fast search modes. Fast search in a horizontal direction is effected by increasing the speed of horizontal deflection of the scanning beam in a major data free area. Fast search in the vertical direction is effected by two related methods, these being: first, the use of a wide search pass in which the scanning beam is effectively widened during a horizontal pass, preferably by zigzagging the beam up and down with a simple vertical modulation which is many lines wide; and secondly, by thereafter making an increase in the size of the incremental vertical advance or vertical deflection between successive wide search passes of the scanning beam so that each wide search pass is overlapped with the bottom of the preceding wide search pass.

The overall result of these procedures is that major data free areas in a horizontal direction are scanned at a much higher velocity than normal and major data free areas in a vertical direction are scanned with many fewer passes of the wide search scanning beam. In a preferred embodiment this increased speed is obtained with no additional burdening of the information handling capacities of the transmission path or receiver. With a conventionally type-written letter as a source document, transmission time over a normal telephone line is reduced from an average of approximately 6 minutes to an average of approximately 1 minute.

DESCRIPTION OF THE PRIOR ART

There is an abundance of prior art facsimile and/or narrow band width television systems which utilize variable speed horizontal scanning of the source document or image in order to decrease the band width requirements upon the transmission path and allow higher transmission speeds of the document or image without loss of information or resolution. Some of these systems operate by processing the incoming video data to generate signals which are representative of the rate of change of the video data, this rate of change information being used control the horizontal scanning speed so that a proportionally slow scan speed is used when the rate of change of video is high and a proportionally faster scan speed is used when the rate of change information derived from the video data is low. Other systems of this type use multiple scanning elements so that an extra "early warning" scanning head or sensor horizontally scans the source data slightly in advance of the main reading head or sensor to detect when data elements appear. When data is found by the early warning head the scanning rate is slowed down so that the read head will traverse the data at a slow rate of speed. Similarly, the presence of data free areas is detected in advance by the early warning head so that the scanning rate can be increased by the time that the immediately following read-head reaches the data free area.

Systems which vary the speed of the scanning beam in accordance with the rate of change of the video signal are described for example in U.S. Pat. Nos. 3,204,026, 3,459,886 and 3,384,710 by Doundoulakis as well in U.S. Pat. No. 3,229,033 by Artzt and U.S. Pat. No. 3,479,453 by Townsend. It should be noted Townsend describes a system of this type which is to be used solely in the facsimile receiver in order to compensate for the limited band width of the photographic paper which is used as the reproducing element in the Townsend receiver.

A system using an extra early warning head to give advance warning of the presence of absence of data to control the scan speed accordingly is described in U.S. Pat. No. 3,670,099 by Oliver. An interesting variation of the early warning head idea is described by Covely in U.S. Pat. No. 2,957,941, which in one of its embodiments, uses a single scanning beam to provide both a virtual read sensor and a virtual early warning sensor. In this embodiment of the Covely patent the scanning beam is continually vibrated back and forth horizontally by superimposed modulation during its regular horizontal scan. The video signal developed by the vibrating scanning beam at its forward position is separated by special separation circuitry and treated as though it were a signal generated by a normal early warning head; while the video signal developed at the maximum retrograde position of the vibrating scanning beam is separated in the same manner and treated as though it were a video signal arising from a normal read head.

Apparatus for varying the vertical scan speed is also known in the prior art. For example, in the aforementioned Oliver U.S. Pat. No. 3,670,099, there is provided an additional early warning or advance head which scans one line ahead of the line which is being read by the main reading head. If no data is found during a pass of this one line ahead advance head, at the end of the pass the drum on which the source document is held for scanning is advanced 2 line positions rather than 1 line position so that it effectively skips the blank line which has been detected by the one line ahead early warning head. As another example of such control of the vertical scan speed, in the Covely U.S. Pat. No. 2,957,941 the detection of data in the line being scanned by the vibrating scanning beam is used to reduce the vertical scanning speed in the same way that it is used to reduce the horizontal scan speed.

Referring more generally to the above-mentioned prior art patents which utilize systems for varying scanning speed in response to detected data, it should be noted that in a number of them, as for example in the Doundoulakis and Artzt patents, it is necessary to provide elaborate methods for transmitting the speed control information which is developed by the transmitter over the transmission path to the remote receiver so that the receiver will have available the same speed control information and thereby remain in synchronism at all times with the transmitter during the transmission and reproduction of a source document. Such requirement for transmission of speed control information over the transmission path additionally burdens the band width capabilities of the transmission line. Also, this necessitates the use of additional and complex equipment in the receiver for reconstituting and utilizing the speed control information.

In these prior art devices, the requirement for transmitting speed control information over the transmission path through the receiver can be avoided by duplicating in the receiver an early warning system similar to the transmitter early warning system. This is done, for example in the Covely patent in which the received video signal is used directly as an early warning signal relative to a delayed video signal which is formed by tapping off and delaying the received video signal in a video delay line. In this arrangement the received video signal functions as the early warning signal and the delayed video signal functions as the normal read signal. However, such prior art arrangements require the use of complex video delay and reshaping circuitry in the facsimile receiver and also requires the substantial duplication in the receiver of the speed control circuitry of the transmitter.

It should also be noted that none of the prior art systems which have been examined by applicant provide simple and effective methods for examining a wide band across the document for the presence of absence of data so that such bands if they are free of data can be rapidly scanned or skipped over. The prior art appears to merely provide one line ahead early warning scanning using an additional early warning sensor and quite complex early warning circuitry. There is no suggestion of using a vertically modulated horizontal scanning beam to provide a wide search pass which, in a single pass across the document scans all of the area in a wide (many lines wide) band across the document without any additions or increments to the read circuitry.

SUMMARY OF THE INVENTION

The present invention provides methods and apparatus for producing a very major speed up of transmission time in a facsimile system by using information available in the facsimile transmitter to sense and locate boundaries between data filled areas of the document and probable major data free areas of the document. In accordance with such sensing the transmitter is utilized in a number of fast search modes in which the transmitter very rapidly sweeps its scanning beam in a full or partial search pass across proposed data free areas while simultaneously suppressing transmission of corresponding video data to the receiver during such fast search modes. In the preferred embodiment, if data is not found during a pass of the scanning beam, a new fast search pass will be initiated, so that large data free areas can be rapidly covered in a succession of fast search passes of appropriate modes or types. However, if data is found during a pass, the next pass will be begun with a slow scan, suitable for reading and transmission of video data.

As previously indicated, fast search in a horizontal direction is effected by increasing the speed of horizontal deflection of the scanning beam throughout a proposed major data free area. Such fast search in the horizontal direction may take place throughout all or a portion of a horizontal pass of the scanning beam. In the preferred embodiment, a transition to fast search is accompanied by a one-line-space temporary downward deflection or bias of the scanning beam. This facilitates search for data boundaries and also permits the system to make a slow scan retrace of a line (by eliminating the bias) whenever data is actually found in a search pass.

Fast search in the vertical direction is effected by two related methods: (1) the use of a wide search pass in which the scanning beam is effectively widened during a horizontal pass, preferably by zigzagging the beam up and down with a simple vertical modulation which is many lines wide; and (2) by thereafter sufficiently increasing the spacings between successive wide search passes of the scanning beam so that each successive wide search pass is only slightly overlapped with the bottom of the preceding wide search pass.

The overall result of these procedures is that certain data free areas in a horizontal direction are scanned at a much higher velocity than are data filled areas; and major data free areas in a vertical direction are scanned with many fewer passes of the wide search scanning beam. A very major speed up in transmission speed and consequent reduction in time and cost of transmission is thereby obtained.

In a preferred embodiment of the invention the methods and apparatus described above are mechanized and arranged so that additional information concerning change in horizontal speed and changes in width of the transmitter scanning beam does not have to be communicated to the remote receiver. In addition, information concerning temporary downward deflections of the scanning beam does not have to be transmitted to the remote receiver. Even when, in one mode of operation, the transmitter scanning beam increases its speed abruptly and drops down one line space in the middle of a horizontal pass, or when, in a second mode of operation, it is both speeded up and effectively widened (by applied vertical modulation) for the full duration of a pass, additional information describing such abrupt changes in velocity or temporary vertical deflection or width of the scanning beam does not have to be sent to the remote receiver. In these modes of operation the receiver can be allowed, to remain ignorant of the speed change, or temporary vertical deflection or width change of the scanning beam, and to proceed normally at its own slow horizontal scan speed, vertical level, and beam width.

This is an unique type of operation because it accomplishes very substantial redundancy reduction by means of search associated speed changes and/or temporary vertical deflections and width changes of the transmitter scanning beam without the necessity of burdening the information handling capabilities of the communication channel with additional new information describing these search associated changes of transmitter beam operation. This is in marked contrast to the many prior art devices in which horizontal, and/or vertical, speed or position changes of the transmitter scanning beam or element must be continually transmitted to and communicated to the facsimile receiver so that the receiver can remain at all times in slaved synchronism with the motions of the transmitter's scanning beam. It should be noted that in such prior art devices, much additional equipment and information handling capacity must be provided in the communication channel of the facsimile system in order to accommodate the communication of such additional information.

The preferred embodiment of the invention is optimized for high contrast printed documents such as typed business letters, pages of a book or other high contrast textual or graphic material. Such documents, it should be noted, usually have fairly uniform left hand margins, but quite variable right hand margins for the data blocks which they contain. Also, in such documents lines of printed material are ordinarily quite precisely horizontal with relatively large full-page-width white or otherwise data free areas providing vertical spacing between the printed lines of the text. These characteristics of conventional printed material coordinate with and greatly facilitate the operation of the preferred embodiment of the invention.

In the preferred embodiment of the invention a redundancy reduction unit constructed according to the invention, controls the motions of the scanning beam of a flying spot scanner to traverse over copy to be transmitted. The redundancy reduction unit employs a digital mode control unit in combination with a memory unit having two memory devices which may be designated as memory 1 and memory 2. In one mode called "fast search only" the transmitter scanning beam is swept through a full pass at relatively high horizontal search speed for the purpose of determining the presence or absence of data and (if data is present) the position of the right hand boundary between data (i.e., text material) and a horizontally following data free area. As the scanning beam progresses through the line, each instant that it passes over printed data, the corresponding value of the beam's horizontal ramp deflection voltage is stored in data memory 1 replacing the previously stored value. Because of this intermittent updating of memory 1 in response to sensed data, when the scanning beam sweeps completely through and out of the data block area, the last voltage value stored in data memory 1 corresponds to the horizontal ramp deflection voltage at the last data position. In this manner, the position of the right hand boundary between data and data free areas is stored in each pass in data memory 1. Near the end of each pass, the voltage value in data memory 1 is copied into data memory 2 where it is stored throughout the entire next pass of the scanning beam to indicate the location of the previously found boundary. Data memory 1 is, of course, freed and made available by such a copying operation to be utilized again in the described manner to determine the data boundary of the next pass.

A mode of operation which may follow a "fast search only" pass is called "scan-search". Scan-search does in fact involve an initial relatively low speed scan of a horizontal line, with a later transition, during the scanning beam's progression through the line, to a high speed search for another right hand boundary between data and data free areas. The scanning spot initially starts at the left hand margin and moves through the data at scan speed until it passes the data boundary determined in the previous pass and now stored in the memory 2. This stored data boundary found in the previous pass, is assumed to be the proposed data boundary for the present pass, and therefore at the time of passage of the proposed boundary, the transition is made to full search speed and at the same time the scanning beam is temporarily deflected or biased downward one line space to the next horizontal line at which level it completes the full pass across the line. If data is encountered during this pass, whether it be in the scan portion or the partial search portion, data memory 1 is updated accordingly and the next scan-search pass is made (by removing the bias) on the same lower line which was partially searched in the preceding pass.

To summarize, during a scan-search pass the scanning beam is deflected horizontally at slow scan speed to the data boundary found in the previous pass. Such a data boundary might have been found in a scan portion of the preceding pass or might have been found in the search portion of a preceding pass. In either event the scanning beam will, shortly after traversing the data boundary, drop down one line and complete its pass at high search speed.

As will be shown in more detail in the detailed description of the preferred embodiment, operations in the manner described with successive scan-search passes have the effect of quite accurately tracing out the right hand boundary of a block of printed data. The scanning beam moves so that it progresses from the left hand margin of each successive line to the data boundary at slow scanning speed, suitable for transmitting video data, and then, after it has passed the data block boundary at that level, makes an instantaneous transition to a high velocity search for the duration of the pass.

It should be again carefully noted that in the preferred embodiment, as the scanning beam makes its transition to high search speed, transmission of video data is simultaneously suppressed, with the transmitter merely sending a constant white or other background representing signal. In this manner the boundary between the data block and the data free area also becomes the boundary between video transmission of rapidly varying data information and selective non-transmission of immensely redundant continual no-data information. In this manner, the desired effect is obtained, in the horizontal direction, of effectively rapidly skipping over major data free areas, and making use of the redundancy of such no-data information by simply transmitting a constant white signal as a low information rate substitute therefor.

As before noted, it is not at all necessary in the preferred embodiment to transmit any additional information to the transmitter regarding the change in velocity of the transmitter scanning beam. The receiver does not need such information because it is effectively blanked by the constant white signal that it receives during fast search. It therefore does not matter and has no consequences to the receiver if it does in fact continue to complete a normal pass at normal slow scan speed while the transmitter scanning beam has made a transition to fast search speed. All that will happen is that the effectively blanked receiver beam will not have completed its own pass at the time that the transmitter beam reaches end of line and causes production of a synchronizing pulse which causes both the transmitter beam and the receiver beam to fly back and be resynchronized to begin their next passes. The temporary lack of synchrony between the receiver beam and the transmitter beam is not of any consequence because the receiver beam is effectively blanked and is not printing data at such times.

The manner in which transition to fast search is made during a horizontal scan in response to a previously sensed data boundary has now been sufficiently discussed, and we may now consider the manner in which transition to fast search modes are made in a vertical direction. In the preferred embodiment, if no data is found during a complete horizontal pass, a transition will be made to some type of fast search mode throughout the entire next pass of the scanning beam. The new search mode during the entire next pass may be a very simple narrow band fast search across an entire line. This will occur under certain specific conditions as determined by the mode sequencing plan of the preferred embodiment. Under other conditions, however, a transition will be made instead to a "wide search" mode which should be understood to be a wide fast search pass across an entire wide band comprising of a plurality of lines. Although the beam might be vertically widened for this purpose by manipulating the astigmatism of the beam, it is preferably effectively widened by simply modulating it with a suitable vertical modulation which deflects the beam up and down in a zigzag pattern over a number of lines as it traverses across the page in its horizontal progression thereacross. In this way the system is alerted in a single pass, to the presence or absence of vertically remote data which it would not otherwise be able to sense without the expenditure of a relatively large number of separate narrow search passes. In the same manner, because of the use of the wide search pass, the system is able to sense the outermost data boundary appearing in a relatively large band of horizontal lines.

If no data is found in a wide search pass, the system will have succeeded in rapidly skipping over a relatively large vertically data-free area, and yet another wide search pass will be ordered so as to attempt to repeat the operation in a succeeding vertical area. The system also makes an increase in the size of the vertical advance or spacing of succeeding wide search passes of the scanning beam so that each wide search pass is overlapped with the bottom of the preceding wide search pass. The exemplary facsimile system which has been previously described in the Campbell, et al., patent has a simple mechanism for controlling the size of the vertical deflection or step between successive passes in accordance with the width of the synchronizing reset pulse which is generated at the end of each pass. Each synchronizing pulse admits charging current to the vertical integrator for the duration of its pulse width and thereby directly controls the amount of vertical spacing which occurs at the end of each pass. The present redundancy reduction system makes use of this already existing feature, and accordingly, originates a signal which is applied to widen the synchronizing pulse whenever an increased vertical deflection spacing is required between successive wide search passes of the scanning beam.

It should be noted that if a wide search pass is originated, and the document is thereafter free of data to the bottom of the page, then this data free area will be completely swept out by a succession of relatively few wide search passes, resulting in a very much higher transmission speed for the transmission and communication of such data-free area. However, if data is found in a wide search pass, then the system makes a transition to scan search, and re-scans; initially at relatively low scan speeds, the same lines which it has unsuccessfully attempted to skip over in the wide search pass in which data was found. In this manner, such data will be found and transmitted in line by line scans or searches of the very same lines which were broadly searched in the preceding wide search pass.

BRIEF DESCRIPTION OF THE FIGURES

FIG. 1 is a schematic and circuit block diagram of a facsimile transmitter and receiver system employing a redundancy reduction unit according to the present invention;

FIG. 2 is a timing diagram showing on a common time scale the waveforms of a number of signals which may be utilized by the redundancy reduction unit of FIG. 1;

FIG. 3 is a diagram illustrating possible modes of operation of the transmitter scanning beam which may be utilized by the redundancy reduction system of the present invention;

FIG. 4 is a diagram showing exemplary placements of data blocks on the face of a source document and the corresponding scan or search paths followed by the transmitter scanning beam in its sequenced modes of operation;

FIG. 5 is a state diagram flow chart illustrating the sequencing of modes of operation of the scanning beam in one exemplary embodiment of the invention;

FIG. 6 is a state diagram flow chart which is ancillary to the flow chart of FIG. 5 and shows the mode sequencing which may be utilized in start-up operations;

FIG. 7 is a detailed block and circuit diagram of a redundancy reduction unit which may be used in the transmitter receiver system of FIG. 1;

FIG. 8 is a schematic circuit diagram showing deflection and sync width control circuitry adapted to respond to control signals issued by the redundancy reduction units of FIG. 7 of FIG. 9.

FIG. 9 is a block diagram of an alternate embodiment of a redundancy reduction unit according to the invention;

FIG. 10 is a state diagram flow chart showing the mode sequencing utilized in the redundancy reduction unit of FIG. 9.

FIG. 11 is a state diagram flow chart which is ancillary to the flow chart of FIG. 10 and illustrates mode sequencing which may be employed during start-up operations of the redundancy reduction unit of FIG. 9.

DETAILED DESCRIPTION OF THE PREFERRED EMBODIMENTS

FIG. 1 shows a schematic and block diagram of a facsimile transmitter generally designated 10 and a facsimile receiver generally designated 11, adapted for substantially simultaneous transmission and remote reception of the image of a source document 30a which is mountable on the face 31 of a target frame 32. Both the transmitter and receiver shown in FIG. 1 can be considered to be substantially similar to the transmitter-receiver described in the before-referenced co-pending Kolker U.S. Pat. No. 3,952,144, to which reference can be made for further description of the operation and mechanization of the elements of the transmitter and receiver. Further detailed description of operation and mechanization of certain elements of the transmitter and receiver can be obtained by reference to the before-mentioned issued Campbell, et al., U.S. Pat. No. 3,843,839.

The transmitter of FIG. 1 of the present application is however equipped with an additional control module which is designated as Redundancy Reduction Unit 100, which receives as inputs thereto a plurality of operating signals, which are available from other elements of the transmitter, and uses these signals as input information thereto from which it determines and sequences appropriate modes of operation of the scanning beam of the transmitter 10. In order to accomplish such control of the modes of operation of the scanning beam of transmitter 10 the Redundancy Reduction Unit 100 as indicated in FIG. 1 produces a plurality of output control signals which are applied to other elements of the transmitter to selectively order fast horizontal deflection velocity, temporary one line ahead vertical deflection or bias, temporary inhibition of video transmission, widening of the synchronization pulse to effect wide vertical spacing, and gating or passing of vertical modulation signals to accomplish effective widening of the transmitter scanning beam.

Because the Redundancy Reduction Unit is an added module which utilizes available signals of the transmitter and generates control signals which order operations of already existing elements of the transmitter, detailed discussion of the input and output signals of the redundancy reduction unit and of its internal operations will be deferred until we have completed a brief description of the overall operations of the transmitter 10.

Referring now in more detail to transmitter 10, as shown in FIG. 1 a conventional cathode ray tube 37a and lens system generally designated 39a together with the cathode ray tube horizontal deflection unit 41a and its vertical deflection unit 43a form a substantially conventional flying spot scanner generally designated 45a which is capable of forming a narrow light beam which can be swept or scanned under the control of the horizontal and vertical deflection units in successive left to right downwardly progressing scans of the target, until a complete scan of the source document 30 has been completed, at which time the horizontal and vertical deflection units are disabled and the scanning operation remains quiescent during an end of frame period, until a signal Manual Start (or the like) is applied to the transmitter to initiate another frame or sequence of transmission of a source document.

As shown in FIG. 1, the flying spot scanner 45A is adapted so that it begins its scanning operation with its scanning light beam directed at the left-hand portion of a black-white calibration strip 47 which is affixed to the target frame 32 directly above the document image area and which has its first or left-hand half imprinted black and its second right-hand half imprinted white. Alternatively, the calibration strip may, if desired be positioned at the extreme upper portion of the document 30 with the second half of strip 47 being apertured or absent to expose the background area of the document itself as the "white" portion of the calibration strip. Such an alternative usage of the calibration strip has the effect of causing the background areas of the document to be reproduced as clear white even though tinted or otherwise slightly shaded paper is used in the source document.

As further shown in FIG. 1 a photosensor generally designated 53 is positioned adjacent to the target areas being scanned, to collect light which is reflected by the scanning beam from the black and white areas of calibration strip 47 and from the background and image areas of the source document 30. The photosensor 53 in response to the fluctuating values of the reflected light generates and applies a correspondingly varying electrical signal to a photosensor preamplifier 55. The output of photosensor preamplifier 55 is an uncorrected variable voltage video input signal, designated $V_{in}$, which represents the intensity of shade of the target areas being scanned, such shade intensity varying over a range of values between a black intensity and a white intensity. The video input signal $V_{in}$ is subject to undesired voltage offsets and gain variations because of drifts in the voltage and circuitry of the light forming, light detecting, and signal amplifying elements of the overall system. As shown in FIG. 1, a photosensor preamplifier 55 applies such uncorrected video input signal $V_{in}$ to the video input of an automatic background and contrast control (ABC) unit 35a so that the ABC unit can operate upon the uncorrected video input $V_{in}$ to produce a corresponding corrected video output signal $V_0$. Such output signal $V_0$ is applied by the ABC unit to the video input of the transmitter's transmit modulator 57 for incorporation in a modulated signal which is formed by transmit modulator 57 and transmitted over a predetermined transmission path to remote receiver 11.

Referring still to transmitter 10, as shown in FIG. 1 horizontal deflection unit 41a applies sawtooth type ramp voltages (see FIG. 2) to deflection coils 39 of cothode ray tube 37a so as to drive the scanning beam in its successive left to right and fast fly back scanning deflections. Horizontal deflection unit 41a also applies corresponding ramp voltage signals to a synchronizing pulse generation unit which is designated as sync generation unit 59 and also applies a corresponding ramp voltage signal designated RAMP to ABC unit 35a.

Sync generation unit 59 operates as a precision level detector and pulse generator which monitors the voltage levels in the horizontal RAMP signal applied to it by horizontal deflection unit 41a and detects when voltage levels are attained corresponding to an end of line position of the scanning beam. At such point sync generation unit 59 produces a plurality of synchronizing pulse signals including a PRE-Sync signal, a Sync signal, and a Post-Sync signal. The Sync pulse signal is a controllable width pulse which is applied back to horizontal deflection unit 41a to cause flyback of its RAMP voltage at end of line. The Sync pulse signal is also applied to the vertical deflection unit 43a to cause predetermined charging (during the duration of the Sync pulse) of a vertical integrator contained therein so as to increase the deflection voltage and thereby make a vertical deflection of the scanning beam to the next successive line which is to be scanned. The Sync pulse is also applied to ABC unit 35a to facilitate its internal operations as described in the copending Kolker application. Sync generation unit 59 also applies a plurality of synchronizing pulses, including the Sync pulse signal, a PRE-Sync pulse signal and the Post Sync pulse signal to transmit modulator 57 so that transmit modulator 57 is able to incorporate such synchronizing information in its modulated output signal for transmission to receiver 11 to direct the scanning operations of receiver 11 in slaved synchronism with the scanning operations of transmitter 10. As is described in detail in the Campbell et al U.S. Pat. No. 5,843,849 the PRE-Sync and Post-Sync pulses are fixed duration pulses which are provided as bracketing or sandwiching in time the main synchronizing pulse signal, Sync. Each of these synchronizing signals occasions a corresponding modulation frequency of the transmit modulator 57, and the presence of the PRE-Sync and Post-Sync modulation greatly facilitate undistorted reception over the transmission path of the primary modulation which represent the primary Sync signals.

The vertical deflection unit 43a, in addition to applying a vertical deflection voltage to deflection coils 39 of cathode ray tube 37a, also applies a corresponding deflection voltage signal to an end of frame detector unit 61 which functions as a precision level detector and latch. End of frame detector 61 latches or changes state to produce an end of frame signal designated EOF whenever the vertical deflection voltage which it receives reaches a level corresponding to the completion of scanning of a full page. When the end of frame condition is thus detected by unit 61, it applies the signal EOF at its high level to vertical deflection unit 43a, horizontal deflection unit 41a, and sync generation unit 59 to cause them to be quiescent and suspend their production of scan deflection voltages and synchronizing pulses. At this same time, at end of frame, the EOF signal is applied as a general "reset" signal to the ABC unit and is also applied to an input of the transmit modulator 57 so that the end of frame information will be incorporated in the modulated output signal of the transmitter and thereby made available to facsimile receiver 11.

Once the end of frame EOF signal has been generated the transmitter remains quiescent, with the scanning beam passively directed as shown in FIG. 1 at the beginning of the calibration strip, until such time as the manual start signal (MANUAL START) is applied to an input of end of frame detector 61 to unlatch or reverse the state of detector 61 and thereby switch its output signal EOF to its low level. When the EOF signal is so switched to its low level ($\overline{EOF}$) the suppression of the operations of the scanning system is lifted and the transmitter again begins its ordinary scanning operations for the scanning and transmission of another frame of a source document.

As noted, the transmitter ABC unit 35a receives the uncorrected video voltage signal $V_{in}$, the end of frame signal EOF, the horizontal ramp signal RAMP, and the end of line synchronizing signal SYNC. The ABC unit also receives a mode information signal MODE which indicates to the ABC whether it is to function as part of a transmitter or as part of a receiver. The MODE signal is generated by a signal pole two position switch which is connected at one position to a source of positive voltage V+ representing a "high" logic level (indicating that the ABC is to function as part of a transmitter), and is switchable to a second position which is open circuited representing a "low" logic level (indicating to the ABC that it is to function as part of a receiver). The ABC unit 35a produces a corrected video output signal $V_0$, which as herebefore stated is applied to the input of transmit modulator 57. ABC unit 35a also produces and applies to vertical deflection unit 43a, at appropriate times, a special signal designated the ADVANCE signal. The Advance signal is issued immediately after the transmitter has made two initial calibration scans of the black-white calibration strip 47 and causes vertical deflection unit 43a to increase its deflection by a predetermined amount so as to deflect the scanning beam down from calibration strip 47 and into the main image areas of source document 30.

In order to understand the normal synchronism of scanning operations which is maintained between transmitter 10 and receiver 11, reference is made now in FIG. 1 to facsimile receiver 11. Because of the quite detailed description which has been provided of transmitter 10, it is now possible to quite briefly summarize the corresponding structure and operations of receiver 11.

In receiver 11, a Demodulator and Sync Separator Unit 71 is provided which receives the modulated signal transmitted to it by transmit modulator 57 of transmitter 10 via the transmission path. Demodulator and Sync Separator 71 extracts from the received signal a corresponding video signal which has been subjected to distortion in the transmission path and to various voltage and gain variations in the demodulator portion of unit 71, and applies this video voltage analogously designated as uncorrected video signal $V_{in}$ to a corresponding ABC unit 35b. Demodulator and Sync Separator 71 also extracts from the transmitted signal corresponding synchronizing pulses SYNC and EOF which are applied as shown to ABC unit 35b and also to horizontal and vertical deflection units 41b and 43b to synchronize and order the scanning operations of receiver unit 11 in normally slaved synchronism to the corresponding scanning operations of transmitter 10.

The corrected output signal analogously designated $V_0$ which is produced by ABC unit 35b is applied through an amplifier 73 to the cathode ray tube 37b to control the intensity of the scanning light beam which is formed by cathode ray tube 37b and its associated lens system 39b and focused on the corresponding areas of the photosensitive recording medium which serves as the copy document 30b. The cathode ray tube 37b with its associated elements forms a flying spot recorder 45b which is driven in its horizontal and vertical scanning operations by horizontal and vertical deflection units 41b and 43b respectively, in the manner herebefore described, under the control of the various synchronizing pulses provided by Demodulator and Sync Separator 71. Just as in the transmitter, ABC unit 35b receives the Ramp signal from horizontal deflection unit 41b and at the appropriate time applies the Advance signal to vertical deflection unit 43b.

We have now completed a summary of the normal operation of transmitter 10 and receiver 11 of FIG. 1 and are now prepared to consider in greater detail the manner in which such normal operations are altered by the mode selection and sequencing operations of the Redundancy Reduction Unit 100 of transmitter 10. As shown in FIG. 1, Redundancy Reduction Unit 100 receives as input signals thereto the horizontal ramp deflection voltage signal RAMP which is provided by horizontal deflection unit 41a, the end of frame signal EOF which is provided by the end of frame detector 61, the PRE Sync, POST Sync, and Sync synchronizing signals which are provided thereto by Sync Generation Unit 59, and the corrected video output signal $V_0$ which is received from ABC Unit 35a. RRU 100 also receives a suitable vertical modulation wave form signal MOD which is provided by an oscilator 101 which produces any type of sawtooth or other suitable wave form which may be utilized to effectively widen the scanning beam by vertically zig-zagging the scanning beam up and down over a number of lines while it progresses horizontally through a wide search pass. As further indicated in FIG. 1 Redundancy Reduction Unit 100 utilizes all these input signals (with the exception of MOD) as information signals which enable the Redundancy Reduction Unit to determine and sequence the appropriate modes of operation of the scanning beam of transmitter 10 of FIG. 1.

To effect such control the Redundancy Reduction Unit 100 produces a plurality of output control signals as discussed below:

One of the important output control signals of the RRU is fast control signal, signal X which controls the speed of horizontal deflection. The X signal is applied to the horizontal deflection unit 41a. When the X signal is at a high or 1 representing logic level, the horizontal deflection unit responds thereto to increase the horizontal deflection velocity of the scanning beam to a fast search velocity, which may be, for example, ten times normal scan velocity. The fast control X signal is also applied to vertical deflection unit 43a which responds thereto to produce a temporary one line ahead deflection voltage or bias which temporarily moves the transmitter scanning beam down one line width during the duration of the 1 representing level of the fast control signal. The fast control signal X is also applied to the transmit modulator 57 to inhibit normal video transmission of data during the duration of the 1 representing level of the X signal. During such periods, the transmit modulator responds to the X signal by transmitting a modulation representing a constant white representing value of the video voltage $V_0$. As indicated in FIG. 1 the RRU also makes available a signal $\overline{X}$ which is complementary to the fast control signal X and may be utilized, as may be required, in effecting the above described operations of the fast control signal X.

The RRU 100 also produces as an output signal a WIDE Sync control signal, signal R, which is applied to the sync generation unit 59. The WIDE Sync Signal, it should be understood, has significance only during a time period in which a new Sync pulse is being formed. The sync generation unit 59 will respond at such time to the WIDE Sync control signal R (at its high or 1 representing logic level) to widen the Sync pulse which is produced at such periods so as to thereby cause the vertical deflection unit 43a to occasion a corresponding increased vertical spacing of the transmitter scanning beam before the next pass thereof.

RRU 100 also selectively produces a gate control signal S which is suitable for gating or controlling the application of the vertical modulation wave form MOD to the vertical deflection unit 43a to effect the beforedescribed vertical modulation or vertical zig-zagging of the scanning beam which is utilized in the wide search scanning mode of the redundancy reduction system. As indicated in FIG. 1, the vertical modulation gate control signal S is used in the present embodiment internally with RRU 100 to (at it's 1 representing logic level) gate or pass through the applied modulation wave form MOD to produce a Gated Vertical Modulation output signal. It should be noted, however, that there is no necessity for doing such gating operations internally, and that if desired, the gate control signal S can be made available to the vertical deflection unit or other suitable apparatus to control such gating operations of the modulation wave form MOD at a remote situs.

For purposes of clarification, reference is made now to the timing diagram of FIG. 2 which shows on a common time scale exemplary wave forms of a number of signals which are utilized in the operations of Redundancy Reduction Unit 100. As indicated in FIG. 2, the end of frame signal EOF is initially at a high 1 representing logic level both in the idle period which exists when power is first turned on and also in the idle period which exists after a frame of document transmission has been completed and the next frame has not yet begun. Such idle periods may be ended when the Manual Start signal is applied to end of frame detector 61. In response thereto, as shown in FIG. 2 the EOF signal makes an abrupt transition to a low 0 representing logic level (EOF) and remains at such low level throughout the entire frame of document transmission.

It will be remembered that during each frame of document transmission the scanning beam of the transmitter is swept across the document in many successive horizontal passes under the control of the horizontal deflection voltage RAMP signal. Exemplary wave forms of the RAMP signal are shown in FIG. 2 for a normal operation first pass, a second pass and then (after an indefinite time interval indicated by the broken lines) for an nth pass, an $n + 1$st pass, and an $n + 2$nd pass, where n is an arbitrary integer. As indicated in FIG. 2 the RAMP signal may have a normal slowly rising deflection voltage during the first pass following the transition of signal EOF to its low level. This slope of the RAMP signal corresponds to normal scan speed of the transmitter scanning beam. When the RAMP signal reaches a pre-determined maximum voltage, it triggers the production of a Sync pulse by sync generation unit 59 and this Sync pulse is in turn applied back to the horizontal deflection unit 41a (as shown in FIG. 1) to discharge the horizontal integrator contained therein and thereby return the RAMP signal to its starting voltage during the duration of the first Sync pulse as indicated in FIG. 2.

As further indicated in FIG. 2, each Sync pulse is immediately preceded in time by a PRE Sync pulse and succeeded in time by a POST Sync signal so that the Sync signal is bracketed or sandwiched in time by the immediately adjacent PRE Sync and POST Sync pulses, as is illustrated in FIG. 2.

It will be noted, in FIG. 2, that the slope of the RAMP signal is shown as being identical in the first pass and the second pass corresponding to the slow constant scan velocities used throughout each of these passes. As shown for purposes of example in FIG. 2, during the nth pass the RAMP signal has a very much higher slope corresponding to the high horizontal deflection velocity used in any type of fast search pass, as for example in a first wide search pass. Following the nth pass, it is seen, referring to FIG. 2, that the Sync pulse has been widened corresponding to the extra wide vertical spacing between two successive wide search passes; and the RAMP signal has, accordingly, again a steep slope during the $n + 1$st pass corresponding once again to the high horizontal velocity which is used in a wide search pass. The Sync pulse at the end of the $n + 1$st pass is shown in FIG. 2 as being of normal width (indicating the wide search pass at the $n + 1$st pass has found data and is therefore to be succeeded by a normal scansearch pass on the $n + 2$nd pass.

As indicated in FIG. 2, the RAMP signal during the $n + 2$nd pass begins the pass with a normal slope corresponding to slow scan speed and then near the middle of the pass makes a transition to a steep slope corresponding to a fast search speed of the scanning beam for the remainder of the $n + 2$nd pass. The transition point between the normal slope and steep slope of the signal RAMP corresponds to the point at which the scanning beam, during this $n + 2$nd pass, traverses past the data boundary found in the preceding pass, and therefore, in accordance with the scan-search operation makes an instantaneous transition to fast search speed for the remainder of the pass.

The Redundancy Reduction Unit 100 also makes use in its internal operations of two additional signals; namely, an overlapping Sync signal OL Sync, and an end of line signal EOL. These two signals are derived from the PRE Sync, Sync, and POST Sync Signals. The wave forms of OL Sync and EOL are shown in FIG. 2. As indicated in FIG. 2, OL Sync represents a logical OR combination or summing of the PRE Sync, Sync and POST Sync pulses so that the total duration of each OL Sync pulse is from the beginning of PRE Sync and on through the full duration of Sync and POST Sync, terminating with the end of POST Sync. In other words, the overlapping Sync signal OL Sync can be considered as a pulse which has the combined time duration of PRE Sync, Sync, and POST Sync. The end of line signal EOL, as indicated in FIG. 2, may be derived from the falling edge of each SYNC pulse, or alternatively from the leading edge of each POST Sync pulse, and is a short positive signal which marks the end of each pass and may be used as a master timing or clocking signal for the operations of Redundancy Reduction Unit 100.

Reference is now made to FIG. 3 which shows in diagrammatic fashion possible modes of operation of the transmitter scanning beam during any pass. As indicated in FIG. 3, the modes of operation which are utilized in Redundancy Reduction Unit 100 are designated as follows:

| MODE DESIG-NATION | TYPE OF OPERATION |
| --- | --- |
| Mode C | Scan-Search<br>Scanning beam initiates pass at slow scan speed and then if it passes data boundary found in previous scan, drops down one line and completes the remainder of the pass at high search speed. Scan portion of pass is at normal line position. Search portion of pass is temporarily biased one line ahead. Figure 3 shows a normal Mode C pass in which a previously found data boundary is passed and a transition to high search speed is made; and also shows an initial or calibration Mode C pass in which the entire pass is accomplished at slow scan speed and any possible transitions to high search speed are suppressed. |
| Mode B | Search Only<br>Scanning beam traverses a complete pass at fast search speed. The entire pass is traversed at a line position which is biased one line ahead of normal line position. |
| Mode A | Wide Search<br>In a wide search pass, the scanning beam traverses the full width of the line at fast search speed. The pass is in addition modulated in zig-zag fashion by an applied vertical modulation signal so as to zig-zag back and forth across four line spaces thus making four line spaces the effective width of the scanning beam during a wide search pass. The starting line position of a wide search pass is biased one line ahead of normal line position, and the zig-zag vertical modulation sweeps the beam forward and back over line position. |
| Mode D | Extra Wide Search (OVERLAPPING WIDE SEARCH)<br>In an extra wide search pass the scanning beam is performing an extra or additional wide search pass following a first or preceding wide search pass. The extra wide pass is therefore characterized by a one line ahead bias and four line wide vertical modulation. It also has an extra wide (3 line width) spacing from the top of the preceding wide search pass, so that a Mode D wide search pass is overlapped one line spacing with the bottom of the preceding wide search pass. Such wide spacing is provided in the preferred embodiment by widening the immediately preceding WIDE Sync pulse. |

Exemplary paths of the scanning beam in each of these modes of operation is shown diagrammatically in FIG. 3 in which a solid line indicates a path that the scanning beam will traverse thereover at slow scan speed, while a dotted line indicates a path the scanning beam will traverse thereover at fast search speed. The small arrows at the left hand portion of each of the scanning beam paths indicate the location of normal line position and it is seen that only the scan portion of a scan search pass is initiated at normal line position while all other search portions traverse at a one line ahead bias location with respect to normal line position. Normal line position can be understood to be the line which the transmitter scanning beam would be traversing, if all temporary one line ahead biases were removed. It can also be understood to be the line position at which the scanning beam of the receiver will be traversing (since the receiver is ignorant of any temporary one line ahead biases).

As further indicated in FIG. 3, the pathways of the mode A wide search pass and the following mode D extra wide search pass are shown at their appropriate spacing with respect to each other, illustrating the three line spacing between the tops of these passes, and the resultant one space overlap between successive wide search passes.

It should be understood that in the preferred embodiment of the invention the normal spacing between horizontal lines is approximately 0.01 inch so that normal line spacing is indeed very fine and is capable of resolving very small details and data areas. The peak to peak spacing of the zig-zags of the wide search pass is approximately 1/10th of an inch, thus assuring good resolution and ability to detect substantially any data which lies in the path of the wide search pass. It should be further understood that fast search velocity, when it is ordered, may be for example, ten times the normal slow scan velocity, so that very substantial time savings are achieved when fast search modes are successful in rapidly passing over data free areas.

With the understanding that has now been gained of the available modes of operation of the transmitter scanning beam, we can now illustrate in detail the manner in which some particular exemplary document will be read by appropriate sequencing of these modes of operation of the scanning beam. Reference is now made to FIG. 4 which can be considered as showing, for purposes of example, a selected portion of the face of source document 30 which is illustrated in FIG. 1 as the source document to be scanned by the transmitter scanning beam. In FIG. 4, two data blocks which appear on the selected portion of document 30 are each represented by a cross hatched area enclosed by phantom line closed curve. As shown in FIG. 4, such closed line curve outlines the boundaries of an upper data block and a second closed line curve outlines the boundaries of a lower data block appearing on the selected portion of source document 30. Each of the data blocks can be understood to be completely black in its interior and printed on an otherwise white background. For purposes of example, the lower data block is shown as being identical in size, shape and orientation with the upper data block.

The paths taken by the scanning beam in its successive passes across the face of the document are shown diagrammatically in FIG. 4 using the same conventions of illustration that have been previously used in connection with FIG. 3. The successive "true" lines of this portion of the source document are numbered at the extreme right hand margin of FIG. 4, as for purposes of example, lines 10, 11 through 49. The paths of the scanning beam passes which are used to read through the illustrated portion of the document, are numbered as the 1st pass, 2nd pass, through the 19th pass. Passes beyond the 19th pass are not shown at the bottom of FIG. 4, for the reason that such passes can be adequately described and seen, by referring again to the 3rd through 16th pass. We are able to obtain such economy of description and representation in FIG. 4 because of the fact that the lower data block has been illustrated as being identical in shape and relative position with the upper data block, so that passes beyond the 19th pass (i.e. the 20th through 34th passes) will merely repeat and be identical with the 3rd through the 17th passes. In this manner we are able to describe with considerable economy a large number of successive passes of the scanning beam, as may be used by the redundancy reduction system of the invention in scanning the illustrated portion of the face of document 30 as shown in FIG. 4. Each illustrated pass of the scanning beam has a lettered designation (C, B, A or D) which appears at the left hand margin of the FIG. 4 and identifies the mode of operation in which the scanning beam operates during its pass.

Discussing now the successive passes of the scanning beam shown in FIG. 4, it is assumed that there has been a substantial data free area above the first pass and therefore the first pass is illustrated as an extra wide search pass (D mode pass) in which the scanning beam is traversed across the document at a fast search speed accompanied by a four line wide zig-zag vertical modulation. Because no data is found in the first pass a second extra wide search pass is initiated whose top has a three line width downward spacing from the top of the preceding wide search pass of the first pass. Note that the extra wide search pass of the second pass is overlapped one line with the bottom of the preceding wide search pass of the first pass.

It should be understood that during both the first pass and the second pass, the scanning beam has a one line ahead vertical bias. If it were not for such temporary vertical bias, the top of the first pass would be at line 9 rather than at line 10 and the top of the second pass would be at line 12 rather than at line 13 as shown. The purpose and usages of the one line ahead bias of fast search modes will become immediately evident in the following description. As indicated in FIG. 4, during the second pass, data is detected by the zig-zagging scan beam at a number of locations, the last found of these data points being designated in FIG. 4 as point $d$. During the second pass, each time that data is found, the corresponding value of the horizontal ramp at that time is stored in a memory 1 to represent the position at which such data is found, each such position value being overwritten in memory 1 over precedingly stored values. Thus, when the second pass leaves the boundary of the data block at point $d$, the value of the RAMP voltage corresponding to position $d$ is left stored in memory 1 and remains stored therein as the pass continues on through data free areas to the right of the data boundary until the end of the pass. At the end of the 2nd pass, the value stored in memory 1 is copied into memory 2 and is available in memory 2 for reference during the entire pass (the third pass) to indicate the location of the data boundary found in the immediately preceding pass (the second pass). Memory 1 and Memory 2 are suitable memory elements within RRU 100 and will be discussed in detail in connection with FIG. 7.

Because data was found in the second pass the redundancy reduction circuit of the invention orders a transition to a scan-search mode (mode C) for the third pass. At this point, we can begin to understand the purpose and value of the one line ahead bias which has been used in the preceding fast search modes of pass 1 and pass 2. Between pass 2 and pass 3 there is a normal one line advance of the scanning beam, so that we would tend to expect that the scan-search pass of the third pass would begin at line 14 which is one line lower than the beginning line (line 13) of the second pass. However, is actuality, as the transition is made to a scan-search mode, the one line ahead vertical bias which has been previously in effect is simultaneously removed, so that as a result of the bias removal the scan search pass of the third pass is able to initiate its pass by retracing the very same top line (line 13) which has been previously traversed by the top of extra wide search second pass. In other words, by using a one line ahead bias throughout all wide search modes, we are able to effectively retrace a line which has already been searched, by merely removing the one line ahead bias. This allows full and careful scanning of all data areas which may be detected in fast search modes by eliminating in this manner the one line ahead bias during the immediately succeeding scan search modes.

As illustrated in FIG. 4, during the scan-search third pass the scanning beam progresses at slow scan speed until it just passes a horizontal position which is represented or stored in memory 2 (the position corresponding to the horizontal location of the data boundary at point $d$) and at that time the scanning beam substantially instantaneously drops down one line and completes the rest of the third pass at fast search speed. Because no data is found in this scan-search third pass, the redundancy reduction system orders a transition to mode B (search only) during the immediately succeeding 4th and 5th passes, accompanied by reinstitution of the one line ahead bias in each of these fast search (search only) passes. The 6th pass is also a mode B, search only, pass, in which, however, data is again discovered which has its right hand boundary at point $e$ as illustrated in FIG. 4. Thus, in the 6th pass memory 1 is updated to the horizontal ramp value corresponding to the horizontal position of the data boundary at point $e$, and this value in memory 1 is copied into memory 2 at the end of the 6th pass. Because data was found in the 6th pass, a new C mode scan-search pass is initiated during the 7th pass which (because of removal of the one line ahead bias) re-scans the same line (the 17th line) which has just been searched in the 6th pass. As the scan-search 7th pass traverses past point $e$, it is noted by the Redundancy Reduction Unit that the ramp voltage at this time has exceeded the value stored in memory 2 and in response thereto the scanning beam is again deflected downward one line and completes the remainder of the 7th pass at fast search speed. Updating of memory 1 is continued as data is encountered in the upper data block, throughout both the scan portions and the search portions of the scan-search 7th pass; and the data boundary position corresponding to point $f$ is therefore stored in memory 1 during the 7th pass and transferred or copied into memory 2 at the end of the 7th pass.

In the same manner, during the 8th pass, a drop down and transition to fast search is made at point $f$, memory 1 is updated to point $g$ and the position value corresponding to point $g$ is copied into memory 2 at the end of the 8th pass. During the 9th pass, a drop down and transition to search speed is made below point $g$, memory 1 is updated to point $h$, and the position value corresponding to point $h$ is copied into memory 2 at the end of the 9th pass.

It is seen, referring to FIG. 4, that by using successive scan-search passes, the right hand boundary of the upper data block has been outlined quite accurately all the way from line 17 through 20. In practice, some additional horizontal bias is utilized so that the scan portions of the scan search passes overshoot to some extent points $e$, $f$, $g$ and $h$ so that the tracing of the right hand boundary of the data block is even more accurate than depicted. It should also be remembered that the actual line to line spacing is of the order of 1/100th of an inch so that the tracing is indeed far more accurate than it would appear from examination of the exaggerated scale illustration of FIG. 4.

Returning now to a discussion of the remaining passes shown in FIG. 4. Because data was found (until point $h$) in the 9th pass, the 10th pass is again a scan-search pass which drops down one line and changes to fast search speed below point $h$, updates memory 1 to point $h$ and copies that value into memory 2 at the end of the 10th pass. Accordingly in pass 11, in response to the stored memory of the probable data boundary at point h, the scan portion of the 11th pass somewhat overshoots the actual data boundary and does not drop down until it reaches the probable proposed data boundary below point h, proceeding then at a fast search velocity to the end of the 11th pass. As in other passes, during the 11th pass the actual data boundary found during that pass (at point i) is stored in memory 1 and is copied at the end of the pass into memory 2 to serve during the succeeding pass as an indication of the probable or proposed data boundary for such next pass. Thus, during the next or 12th pass, in the same manner the scan portion of the 12th pass overshoots the actual data boundary at j and drops down below point i to finish the 12th pass at fast search speed with memory 1 being updated to point j and this value being copied into memory 2 at the end of the 12th pass. In the same manner during the 13th, 14th and 15th passes, the scan portions of these passes overshoot the actual data boundaries (at k, l, and m respectively) and make their downward deflections and transitions to fast search speed in response to the probable data boundaries (j, k, and l respectively) which are stored in memory 2 during these 13th, 14th and 15th passes respectively.

Because a data boundary was found (at point m) during the 15th pass, the 16th pass is also initiated as a mode C scan-search pass. No actual data or data boundary is found during the 16th pass, because its pathway is below the upper data block in a completely date free area. The scanning beam is, however, deflected downward below point m in response to the stored memory in memory 2 of the data boundary at point m which was found in the preceeding pass.

As stated, no data is actually found during the 16th pass and this fact is noted by the Redundancy Reduction Unit, which accordingly orders a transition to mode A wide search pass for the 17th pass. The wide search of the 17th pass finds no data and therefore is succeeded by a D mode extra-wide search 18th pass which again finds no data. Accordingly, another extra wide search pass, the 19th pass, is initiated which does succeed in finding data at a number of points with the outer most boundary of the data block being found at point d. Because the lower data block as depicted in FIG. 4 has been selected so as to be identical in shape and orientation with the upper data block, we do not have to discuss in detail the 20th through the 33rd passes which will be required to scan over and beyond the lower data block for the reason that these passes will be identical in form with the 3rd through 16th passes respectively which have been previously described in connection with the traversal of the upper data block.

It should be understood in connection with FIG. 4 that all of the major modes of operation of the scanning beam under the direction of the redundancy reduction unit of FIG. 1 have now been described, as well as the sequencing between successive modes, as accomplished in accordance with the general redundancy reduction scheme which is utilized in the preferred embodiment of the invention.

Another clearer and probably more operationally useful picture of the desired sequencing of the various modes of operation of the scanning beam can be obtained by drawing a state diagram flow chart illustrating the desired mode sequencing, as shown in FIG. 5. Such a state diagram flow chart is considered operationally useful because once it has been drawn to illustrate the desired mode sequencing in accordance with the general redundancy reduction scheme, it can then be utilized to directly specify and design the digital logic and hence the digital circuitry of an exemplary Redundancy Unit which will order the desired mode sequencing.

Referring now in more detail to FIG. 5, there are shown five large rectangles, each rectangle being divided into an upper block and a lower block and the lower blocks of the rectangles being labeled C1, C2, A, D and B respectively to indicate that these blocks represent corresponding modes of operation C1, C2, A, D, and B of the scanning beam. The arrows between blocks show the directions and conditions for transitions between modes in accordance with the desired sequencing of the general redundancy reduction scheme.

We find that it is desirable to break the overall C mode into two subsidiary modes, C1 and C2, because as illustrated in FIG. 4, it is desired that a first C mode scan-search pass which does not find any data will be followed by a B mode search only pass or, if data is found, will be followed by a subsequent C mode scan-search pass. A subsequent C mode scan search pass which does not find data will be followed by a succeeding A mode wide search pass. Since the rules for succession to a first C mode scan-search pass are different than the rules for succession to any subsequent C mode scan search pass, a first scan-search pass will be designated as a separate mode C1 and all subsequent scan search passes can be identified by a common scan search mode C2. Thus, as far as considerations of mode sequencing are concerned, we actually have five distinct modes, C1, C2, A and D and B as illustrated in FIG. 5.

Referring in more detail to the rectangle, whose lower block is labeled C1, the upper block thereof can be considered as representing a state of the system which, when entered, is preparatory to initiation of the C1 mode or state and which automatically makes a transition to the C1 mode at the time of occurrence of the end of line pulse EOL. Accordingly, the upper block of this rectangle has been labeled PRE-C1 while the lower block has been labeled C1. Similarly, the upper blocks of each of the other rectangles which have been labeled PRE-C2, PRE-A, PRE-D, and PRE-B respectively, can also be considered as representing preparatory states which, when entered, automatically make transitions to states or modes C2, A, D, and B respectively at the time of occurrence of the end of line pulse EOL.

Following through now the desired mode sequencing illustrated by FIG. 5, it is seen that if no data is found in the C1 pass (DATA = 0), a first scan-search mode C1 will be cycled first to a pre B state and then sequenced automatically in response to the next end of line pulse (EOL) to Search Only B mode. With the system in B mode, if no data is found in the B mode pass (DATA = 0) the system cycles back to pre B and therefore returns again to B mode. The system will therefore repeat B mode passes indefinitely until data is found (DATA = 1) in a B mode pass, and in response thereto the system will cycle to PRE C1 and thence to another first scan-search C1 mode.

If data is found (DATA = 1) in a C1 pass, the system cycles to PRE C2 and thence to C2 mode indicating that this is a second successive scan-search pass.

C2 mode as shown in FIG. 5 will recycle back to PRE C2 and therefore return to and repeat C2 mode passes as long as data is found (DATA = 1) in each such C2 pass. However, if data is not found (DATA = 0) in such a C2 pass, the system will then cycle to its PRE A state and will then automatically sequence (in response to end of line pulse EOL) to the wide search mode A. Considering the PRE A wide search mode, if data is not found in a first A mode wide search pass, the system cycles during such pass to PRE D and then automatically sequences in response to EOL to the extra wide search pass mode D. However, referring again to the first wide search, mode A, if data is found (DATA = 1) during the mode A pass, the system will, in response to the finding of such data, again cycle to PRE C1 and return to C1 mode.

Considering again D mode, the extra wide search mode, the system will cycle through PRE D and return to D so long as data is not found (DATA = 0) at each successive wide search D pass. However, if data is found (DATA = 1) during such a D mode pass the system will cycle to PRE C1 and return to its first scan-search mode C1 in response to the EOL pulse occuring at the end of the preceding pass.

Substantially all of the modes of operation of the scanning beam and the desired sequencing therebetween, have now been described and shown in detail in the state diagram flow chart of FIG. 5, and it is therefore now desirable to use this state diagram flow chart to specify one suitable set of states and hence the digital logic for the internal switching elements of one exemplary embodiment of Redundancy Reduction Unit 100.

Because there are five distinct modes of operation we know that we must have a set of flip-flops or other suitable memory devices having a count or combination capacity of at least five in order to specify the five internal modes or states of the Redundancy Reduction system. This indicates that if we use binary memory devices we will require at least three flip-flops or other suitable memory devices in order to uniquely identify the five principal modes and their subsidiary preparatory states.

It will be demonstrated that three flip-flops are indeed sufficient, and these are identified in FIG. 5 as the flip-flops D, H, and L, respectively, as labeled in the PRE C1 block of FIG. 5. As indicated, it is assumed that at the time before EOL immediately preceding a C1 pass (PRE C1) the D flip-flop will be in a 1 state, the H flip-flop will be in a 1 state and the L flip-flop will be in an undetermined state, either a 1 or 0 state, indicated by X immediately below L. Such choice of initial conditions for the D, H and L flip-flops is actually arbitrary and in fact the entire count sequence is arbitrary so long as all necessary unique states are uniquely identified by the count sequence of the D, H and L flip-flops. However, certain principles can be utilized to at least make choices between the many possible designs of the count sequence of the D, H and L flip-flops. First, we should like to use a very simple count sequence if that is possible, and secondly, we should like to use a simple count sequence in which either the output signal of a single flip-flop or simple combinations of the output signals of several flip-flops represent the desired output signals of the Redundancy Reduction Unit which is to be designed. Following such rules will tend to result in very simple circuitry for the resultantly specified mechanization of an exemplary embodiment of the Redundancy Reduction Unit.

We also note that the rules which have been followed for mode sequencing in general depend upon an examination of whether there was or was not data in the present pass and in the preceding pass. Accordingly, we establish a simple shift register type of rule for the sequencing of the D and H flip-flops in which the D flip-flop is used during a pass to read and store therein the presence or absence of incoming data, and then at the end of the pass at EOL the contents of the D flip-flop are shifted or copied into the H flip-flop to be available there during the next pass. (Please note the the D and H flip-flops merely record the presence or absence of data and do not perform the functions of Memories 1 and 2 of RRU 100 which record the positions of such data).

Accordingly, the D flip-flop continually reads the video signal $V_O$ during each pass and is set to its 1 state whenever during the pass the voltage of the video signal $V_O$ indicates that data has been found, the D flip-flop remaining in such 1 state until the end of line, at which time it is cleared to its 0 state by the end of line pulse EOL. Thus at the end of a pass (in the preliminary period before EOL) a 1 value of the D flip-flop will indicate that data was found during that very same pass, while a 0 value of the D flip-flop indicates that no data was found in that very same pass.

Since we wish to know such information during the immediately succeeding pass, at time EOL the stored value in the D flip-flop will be copied into the H flip-flop. For historical reasons, it will be understood that the value (1 or D) in the D flip-flop will be copied reversed into the H flip-flop at time EOL, so that a 1 value of the D flip-flop will be copied reversed as a 0 into the H flip-flop, while a 0 value of D flip-flop will be copied reversed as a 1 into the H flip-flop. Thus, during and just before the end of a pass, a 0 value of the H flip-flop will indicate that data was found in the preceding pass, while a 1 value of the H flip-flop will indicate that no data was found in the preceding pass. These rules govern the count sequence of the D, and H flip flops.

It only remains now to specify some appropriate simple rule for the switching of the L flip-flop. The rule that has been adopted is that the L flip-flop will be switched to a 1 state by the EOL pulse if at that time the H flip-flop is in a 0 state and the D flip-flop is in a 1 state ($\overline{H} \cdot D \cdot EOL$). Once the L flip-flop is set to a 1 state it will not be thereafter reversed to a 0 state until such time as the H and D flip-flops are both in a 1 state at the time of appearance of an EOL pulse ($H \cdot D \cdot EOL$).

With appropriate switching rules established for the D, H, and L flip-flops it becomes possible to immediately fill-in their corresponding states throughout the various blocks of the state diagram flow chart (FIG. 5).

Referring in FIG. 5 to PRE-C1, the states of D, H and L are 1, 1 and X (undetermined either 1 or 0) respectively. At EOL, D is cleared to a 0 value, its former 1 value is copied reversed as a 0 value in the H flip-flop, and L is zeroed (switched to its 0 state) in response to H and D both at their 1 values to thereby sequence from PRE-C1 to C1. Following the downward sequencing path from C1 to PRE-C2 since data is found during the C1 pass, the D flip-flop is switched to a 1 state during that pass and is therefore found to be in a 1 state in PRE-C2. H remains in a 0 state in PRE-C2 and L similarly remains in a 0 state. Upon entrance into C2 in response to appearance of EOL, D is cleared to 0, H has the former 1 value of D copied reversed thereinto and therefore remains at a 0 state, and L is switched by the EOL pulse to a 1 state in response to H at a 0 state and D at a 1 state. In this manner, the count combination 0, 0, 1 of the D, H and L flip-flops uniquely identifies the C-2 mode or state of the Redundancy Reduction Unit.

The manner in which the C-2 mode recycles or repeats itself indefinitely so long as data is found (DATA = 1) at each pass is obvious in view of the foregoing description. It is clear that if data is found during the first C2 pass, C2 will cycle to a PRE-C2 state 101 and will then be resequenced back to C2 mode in response to EOL. Note, as indicated in FIG. 5, that L = 0 during the first occuring PRE-C2 and that L = 1 during the second and all subsequent PRE-C2 states.

When data is not found during a PRE-C2 pass, the D flip-flop remains in 0 state throughout the pass and is therefore still in 0 state in the preliminary period immediately before EOL thereby retaining the count combination 0, 0, 1 of the D, H and L flip-flops to uniquely identify the PRE-A period as contrasted to all other preliminary periods. It is important to uniquely identify the PRE-A period, because this is the time immediately preceding EOL in which the Sync pulse is formed; and the PRE A state of the D, H and L flip-flops must therefore identify that a normal width Sync pulse is to be ordered so as to establish a one step advance prior to the A mode first wide search pass. This is in contrast to the PRE-D state of the D, H and L flip-flops, which must order an extra-wide Sync pulse in order to produce an extra-wide three line advance as is required before a succeeding D mode extra-wide search pass. As it actually turns out, with the described switching rules for the D, H and L flip-flops, the actual flip-flop states during A mode and D mode are identical and the significant difference between the A and D modes is in the PRE-A and PRE-D states. It is seen that the PRE-A state has a 0, 0, 1 count which orders a one line advance while the PRE-D state has a 0, 1, 1 count which orders a three line advance. This count sequencing is completely appropriate, since the wide search A mode and the extra-wide search D modes differ only in their preliminary line spacing with respect to the preceding pass.

We return to a consideration of the 0, 0, 1 count of the PRE-A state. At EOL this count changes to 0, 1, 1 in accordance with the switching rules previously set forth, to thereby designate the A mode wide search pass. If data is found during the A mode wide search pass, a transition is made to the count 1, 1, 1 of PRC-C1. If data is not found during the pass, the count remains at 0, 1, 1 to identify the PRE-D state in which the three line advance is ordered preliminary to the transition (at EOL) to the same count 0, 1, 1 which then controls the ensuing extra wide search pass of the D mode. The D mode count obviously repeats itself indefinitely so long as data is not found on any pass, but if data is found in some succeeding pass the D flip-flop is set to 1 so as to cycle the count to 1, 1, 1 which is recognized as a count which identifies the PRE-C1 period.

When we last considered the PRE-C1 and PRE-C2 periods or states, we examined the vertically downward sequences to the modes C2, A and D. At this time, however, we will examine the sequencing of C1 mode to PRE-B and B and the subsequent return from B to PRE-C1. As indicated in FIG. 5 in the C1 state or mode the flip-flops D, H and L are all 0. If data is not found during the C1 pass, the flip-flops will remain 0 so as to remain at the count 0, 0, 0 which will be recognized as one count designating PRE-B. (0, 1, 0 is another count designating PRE B) Starting from the 0, 0, 0 count of PRE-B, in response to EOL the H flip-flop is set to 1 to reflect the reversed copying therein of the contents of the D flip-flop, so that the count 0, 1, 0 is formed to identify the B mode. In accordance with the flip-flop switching rules stated, B mode will cycle endlessly through PRE-B and back to B mode so long as data is not found in any successive B mode pass. However, when data is found in a B mode pass (DATA = 1) the D flip-flop is switched to a 1 state during the pass so as to cycle the count to 1, 1, 0 which is also recognized to be a count identifying PRE-C1. Thus, PRE-C1 may be identified by either the count 1, 1, 1 (in response to a transition from H or D mode) or by the count 1, 1, 0 (in response to a transition from B mode).

Description of all the count sequencing of the D, H and L flip-flops has been completed and it has been demonstrated that the switching rules adopted are suitable in that they result in count combinations which uniquely identify all of the unique states required in the desired mode sequencing. It is therefore now possible from simple inspection of FIG. 5 and from a consideration of the flip-flop switching rules which have been adopted, to directly write a set of logical equations for the setting and zeroing of the D H and L flip-flops and for the formation of the output signals X, R and S (see FIG. 1) of an exemplary embodiment of the Redundancy Reduction Unit 100.

However, because the state diagram flow chart of FIG. 5 describes the normal operation of the redundancy reduction system and does not encompass the special operations required for start-up and establishment of initial conditions after power is turned on, the logical equations derived from a consideration of FIG. 5 would not be fully complete and would lack a few terms which have to do with such start sequence. It is therefore desirable to first develop a simple state diagram flow chart for a suitable "start" sequence which will cycle the D, H and L flip-flops from the time that power is turned on until in response to the START pulse and the corresponding transition of the EOF signal to a low value (EOF) they are sequenced to a starting combination which is identical with some suitable state (as shown in FIG. 5) of the normal operations of the system. After such start sequence has been specified it will be possible to write complete logical equations for the setting and zeroing of the D, H and L flip-flops and the production of the output signals of the Redundancy Reduction Unit.

Reference is therefore made to FIG. 5 in which a suitable start sequence is set forth which effectively forces the D, H, and L flip-flops into a starting combination corresponding to the C2 mode. As shown in FIG. 6 in response to power being turned on, it is assumed that the D, H and L flip-flops will each be left in some undetermined (either 1 or 0) state. An additional flip-flop which is utilized in the start sequence, the V flip-flop is also left in an undetermined 1 or 0 state in response to the power being turned on.

Considering the usage of the V flip-flop, it will be remembered that in the operation of the described facsimile transceiver system both the first and the second initial passes are preliminary calibration scans which traverse entirely across the black-white calibration strip at slow scan speed. It is therefore desirable to uniquely identify these first and second passes, so as to provide means for suppressing any fast search portions of these two preliminary calibration passes.

We assign a separate flip-flop, designated the V flip-flop, to identify these two passes. The state sequence during start-up will be arranged so that the V flip-flop is 0 during the first two (calibration) passes and will be 1 thereafter. It is desirable to use an additional flip-flop such as the V flip-flop for this purpose because our supply of unique combinations of the D, H and L flip-flops has been fully utilized in the normal mode sequences of FIG. 5, and therefore an additional flip-flop is desirable to effect the additional operations of the start sequence of FIG. 6.

As indicated in FIG. 6 when power is turned on to the facsimile transmitter of FIG. 1, it can be assumed that the D, H, L and V flip-flops are all turned on in some undetermined (either 1 or 0) state. At such time, however, the EOF signal will be at its high (1 representing) logic level corresponding to end of frame conditions, or the time before start and therefore the EOF signal is utilized at this time to initially set the D, H, L and V flip-flops to the states 1, 0, 0, 0, respectively. This can be considered to be a special type of PRE-C2 state in which the V flip-flop has been initialized to a 0 value, so as to be utilizable in suppressing any partial fast searches in the immediately ensuing special C2 mode pass.

In response to the MANUAL START pulse, the end of frame detector 61 (as shown in FIG. 1) is set to its 0 state ($\overline{EOF}$), which thereby permits the first pass to begin. As indicated in FIG. 6, this first pass (pass 1) will be a special C2 mode scan-search pass (as indicated by the 1, 0, 0, combination of the D, H, and L flip-flops) in which any partial fast searches will be suppressed because of the 0 value of the V flip-flop so that the pass can be termed a scan only pass.

Because pass 1 is a calibration pass in which the scanning beam is scanned across black-white calibration strip 47 (as shown in FIG. 1), data will be assuredly found in pass 1, and therefore the system will cycle in the completion of pass 1 to the special PRE-C2 state identified by the combination 1, 0, 0, 0 of the D, H, L and V flip-flops, respectively. The arrival of the EOL pulse at the end of pass 1 initiates pass 2 and zeroes the D flip-flop to thereby establish during pass 2 the special C2 mode which has the combination 0, 0, 1, 0, of the D, H, L and V flip-flops, respectively. Once again, the second pass, pass 2, is also a calibration pass in which data will assuredly be found (DATA = 1) so that pass 2 is completed with a return to the PRE-C2 state, but this time to a PRE-C2 state in which the L flip-flop has a 1 value so that during this PRE-C2 state the overall count combination is 1, 0, 1, 0 for the D, H, L and V flip-flops, respectively.

When the EOL pulse arrives to initiate the third pass the V flip-flop is switched to its 1 state in response to the 1, 0, 1 value of the D, H and L flip-flops respectively (D.$\overline{H}$.L.EOL) so that the V flip-flop is set to a 1 during the third pass and will remain 1 throughout all subsequent passes until the complete frame of document transmission is completed. Thus, at the beginning of the third pass, the system is in a completely normal C2 mode, having a 0, 0, 1 combination of the D, H and L flip-flops and having the V flip-flop in a 1 state. The start sequence has thereby been completed and the system is now in a normal C2 mode and will sequence in a normal fashion as shown and described in connection with FIG. 5.

After completing the state diagram flow charts for both the normal and start sequences as shown in FIGS. 5 and 6, and having specified the switching rules which will be utilized for each of the D, H, L and V flip-flops, it is now possible to directly write by inspection appropriate logic equations for the respective logic circuits which set each flip-flop to its 1 and 0 states. It is also possible, with some consideration of the desired operation of the overall redundancy reduction system, to also directly write by inspection appropriate logical equations defining exemplary circuitry for forming the X, R and S output signals of a suitable embodiment of Redundancy Reduction Unit 100. These logical equations are listed immediately following: [It should be noted in the following equations that the symbol ONE D is used as a designation for a set or "oneing" input signal to flip-flop D which (when such input signal is at a 1 value) has the effect of setting flip-flop D to its 1 state. Similarly the symbol Zero D is used as a designation for a reset input signal to flip-flop D which (at its 1 value) has the effect of resetting or zeroing the flip-flop to its 0 state. Similar nomenclature is used for the set and reset input signals (ONE and Zero input signals) of each of the other flip-flops. It should also be noted that the symbols D, H, L and V are the designations or names of the corresponding flip-flops and are not designations of type of flip-flop. For purposes of convenient reference, the flip-flops may be considered to be conventional Set-Reset (R-S) flip-flops]

FLIP-FLOP SWITCHING EQUATIONS:
(1)  ONE D = DATA. $\overline{OL\ Sync}$ + EOF
(2)  ZERO D = EOL
Where DATA is a 1 valued logic signal formed when the video signal $V_0$ exceeds a predetermined voltage level, indicating that data is present, and
$\overline{OL\ Sync}$ the complement of OL Sync
(3)  ONE H = $\overline{D}$ · EOL
(4)  ZERO H = $\overline{D}$ · EOL + EOF
(5)  ONE L = $\overline{H}$ · D · EOL
(6)  ZERO L = H · $\overline{D}$ · EOL + EOF
(7)  ONE V = D · $\overline{H}$ · L · EOL
(8)  ZERO V = EOF
FAST CONTROL SIGNAL:
(9)  X = H + WV
Where W is a 1 valued logic signal formed when the voltage value of the horizontal deflection RAMP signal exceeds the value stored in Memory 2.
WIDE SYNC CONTROL SIGNAL:
(10) R = $\overline{D}$ · H · L · OL Sync
VERTICAL MODULATION GATING SIGNAL;
(11) S = H · L
GATED VERTICAL MODULATION
(12) GATED VERTICAL MODULATION = H · L · MOD Although the significance of the above provided logical equations will be largely immediately evident to those skilled in the art in view of the foregoing description, it is nevertheless useful to briefly discuss certain features of the logical equations:

Referring to the ONE D logical equation, it is seen that the D flip-flop is set to its 1 value whenever data is found (DATA = 1) and the OL Sync signal is not present. The D flip-flop is also (initially) set to its 1 state whenever the EOF signal is present. Considering the ZERO D logic equation, as previously indicated the D flip flop is zeroed whenever the EOL signal appears. Overall then the D flip-flop is initially set to its 1 state by the EOF signal (during the special start sequence), is zeroed by the EOL signal at the end of each pass, and is set to a 1 value during any pass only if data is found in that pass (DATA = 1) and OL Sync is not present (i.e., the presence of OL Sync will suppress the reading of data). The reason that the reading of data into the D flip-flop is suppressed during OL Sync is to avoid false data readings which might otherwise occur because of the relatively slow fall times and rise times of the photo-sensor PRE-AMP 55 in the periods immediately preceding and following the end of each pass. It should be understood, referring back to FIG. 1, that during the Sync period, the cathode ray tube 37A is blanked by a special blanking amplifier 40 which responds to both the Sync and EOF signals. Photosensor pre-amp 55, because of its relatively slow step response requires a portion of the OL Sync period to recover from the transients caused by the blanking operation. Accordingly the reading of data into the D flip-flop is suppressed during this same OL Sync period so as to assure that false data values are not read into the D flip-flop. The data reading suppression period of OL Sync corresponds to a horizontal scan distance of approximately 1/10th of an inch at the right hand and left hand edges of document 30 so that such suppression of data does not at all adversely affect the scanning of a normal document in which the extreme left hand and right hand data margins can be presumed to be data-free. In addition, the parameters of the horizontal deflection unit can be adjusted if desired so that the data reading suppression period corresponds with margins which are just outside of the edges of source document 30.

It is seen, referring to the ONE H and ZERO H logical equations, that the H flip-flop is initially zeroed in response to the EOF signal and thereafter functions to merely have copied therein the reverse value of the D flip-flop in response to each appearance of the signal EOL.

Referring to the ONE L and ZERO L logical equations, it is seen that the L flip-flop is initially zeroed in response to the EOF signal. Thereafter, in accordance with the switching rules previously described, the L flip-flop is set to its 1 state only when $H = 0$, $D = 1$ and the EOL pulse arrives and it is set to its 0 state only when $H = 1$ and $D = 1$ and the EOL pulse arrives.

Similarly, the ONE V and ZERO V logical equations correspond exactly to the switching rules previously described, the V flip-flop being switched to its 0 state in response to EOF and thereafter being "one'd" only when $D = 1$ and $H = 0$ and $L = 1$ and the EOL pulse arrives. ($D \cdot \overline{H} \cdot L \cdot EOL$)

Of more interest is the logical equation for the fast control signal X. It is seen that the X signal is at a 1 value whenever $H = 1$ or when both W and V are at a 1 value. Because of this OR (+) combination of the H signal and WV signals, it is seen that $H = 1$ (which indicates that there was no data in the preceding pass) acts as a primary fast control signal and will always have the independent effect of sending the X signal to its operative fast control 1 level throughout the full pass as required in mode B search only and modes A or D, the wide search modes. It can be verified from the state diagram flow chart of FIG. 5 that $H = 1$ in all of the fast search modes A, D and B.

For a scan-search mode C1 or C2, $H = 0$ (indicating that there was data in the previous pass) and thereby establishing an initially slow scan ($X = 0$) at the beginning of a scan-search pass, which later makes a transition to partial fast search ($X = 1$) at a later time in the pass if $W = 1$ and $V = 1$. It will be remembered that $W = 1$ indicates that the voltage of the RAMP signal has exceeded the value stored in memory 2 thereby signaling that the scanning beam has traversed past the data boundary recorded in memory 2; while $V = 1$, it will be remembered, indicates that the first two calibration scans have been completed and there is no longer any suppression of fast search by the V flip-flop.

Referring now to the logical equation for the R signal, (the wide Sync control signal), referring to FIG. 5, it is clear that this signal is required during the PRE-D period for state as identified by the 0, 1, 1, combination of the D, H and L flip-flops, respectively (DHL). The Wide Sync control signal orders extension of the time duration or width of the Sync pulse to effect a wide three line advance as required preceding EXTRA WIDE SEARCH (Mode D). In the preferred embodiment, it is desired that the Wide Sync control signal have a time duration which encompasses the Sync signal, and to accomplish such result the OL Sync pulse (which does encompass the Sync signal) is combined with $\overline{D}HL$ to form the Wide Sync control signal as $R = \overline{D} \cdot H \cdot L \cdot OL$ Sync as shown in logical equation 10.

Referring to the S signal which is the vertical modulation gating signal, it is clear from an examination of FIG. 3 and 5 that the vertical modulation gating signal S has to be generated during the A modes and D modes which are characterized by the fact that $H = 1$ and $L = 1$ ($H \cdot L$) in both of these modes so that we can immediately write that $S = H \cdot L$ as stated in logical equation 11.

Accordingly, the MOD signal will be gated or passed through, only when both H and L are 1 as indicated by logical equation 12.

Reference is made now to FIG. 7 which shows a partly block, partly circuit diagram of an embodiment of Redundancy Reduction Unit 100 which is mechanized in accordance with the previously derived logical equations 1 through 12. As shown in FIG. 7, RRU 100 includes a Data Position Memory Unit 700, a Signal Reception Unit 702 and a Mode Control Unit (MCU) 704. The Signal Reception Unit 702 is merely a preliminary processor or conditioner of the incoming signals POST-Sync, PRE-Sync, Sync, EOF, $V_o$ and MOD) which are received by Redundancy Reduction Unit 100. As shown in FIG. 7, Signal Reception Unit 702 functions to make available, in addition to the incoming signals, the complementary signals $\overline{POST\text{-}Sync}$, $\overline{Sync}$ and $\overline{EOF}$. These complementary signals are formed by suitable inverting amplifiers which are tapped off the primary signal lines. The overlapping Sync signal OL Sync is formed in an OR gate 703 as an OR combination or sum of the POST-Sync, PRE-Sync and Sync signals, with the complementary signal $\overline{OL\ Sync}$ again being formed from the primary signal by a suitable inverting amplifier. The end of line pulse EOL and its complementary signal $\overline{EOL}$ are formed by a suitable pulse former circuit 705 which may, for example, comprise a one shot multivibrator responding to the leading edge of the POST-Sync signal to form the corresponding EOL and $\overline{EOL}$ pulses. The video signal $V_o$ is operated upon within Signal Reception Unit 702 by a level detector 706 which functions to produce an output signal designated DATA which has a 1 logic level whenever the voltage of the video signal $V_o$ exceeds a predetermined threshhold level indicating that data is present in the document line being scanned. The DATA signal is combined in a single AND gate 707 with the $\overline{OL\ Sync}$ signal to form an output signal DATA $\cdot \overline{OL\ Sync}$ which is designated as the T signal. The vertical modulation waveform signal MOD is processed within signal reception unit 702 by a suitable amplifier and is made available at the output of Signal reception unit 702. Although not shown in FIG. 7 any of the other input signals may be processed by suitable input amplifiers to provide such functions as level changing, amplification, and/or limiting as may be desirable to condition the signals for use in Redundancy Reduction Unit 100.

It is seen in FIG. 7 that the output signals T and Sync of Signal Reception Unit 702 are applied to Data Position Memory Unit 700 to control its operations. The remaining output signals of Signal Reception Unit 702 are made available through Mode Control Unit 704 to be utilized in its digital mode sequencing and signal formation operations.

Referring in more detail to Data Position Memory Unit 700, it is seen that the horizontal deflection voltage signal RAMP is applied through a suitable amplifier 710 to one input of an electronic switch Q1 whose output is connected to the input of an analog voltage memory unit, Memory 1, which stores any signal admitted thereto by switch Q1 and produces a corresponding output signal designated Y whose voltage value represents the value of the signal stored in Memory 1. Signal Y is in turn applied to one input of a second electronic switch Q2 whose output is applied to a Memory 2.

As shown in Data Position Memory Unit 700 of FIG. 7 electronic switch Q1 is under the control of signal T and is rendered conductive to apply the RAMP signal to the input of Memory 1 whenever signal T has a high or 1 representing value. Similarly, electronic switch Q2 is under the control of the Sync pulse and becomes conductive to apply Y to the input of Memory 2 during each appearance of the Sync pulse. Memory 2 functions in the same manner as Memory 1, and, therefore, stores any values of Signal Y which are copied therein through Switch Q2 to produce corresponding output signal, Signal U, whose voltage value represents the value of the signal stored in Memory 2. The voltage level or value of the Signal U is compared in a Comparator 712 with the voltage level of the incoming RAMP Signal as received from Amplifier 710, Comparator 712 functioning to produce an output signal designated $\overline{W}$ which goes to a low or 0 representing logic level whenever the value of the signal RAMP exceeds the value of the Signal U which is stored in Memory 2. Signal $\overline{W}$ is applied in turn to a suitable inverting amplifier to produce output signal W which is at a high 1 representing logic level whenever the voltage of RAMP exceeds the voltage U stored in Memory 2. The output Signal W of Data Position Memory Unit 700 is made available to Mode Control Unit 704 to be utilized therein in the formation of the X Fast Control Signal.

It will be remembered that the T Signal (T = DATA · $\overline{OL\ Sync}$) will be at a 1 level each time that data is found in the document line being scanned in any pass, so that Switch Q1 may be rendered conductive a number of times during a pass as successive data elements are found, each data element having the effect of transmitting or copying the value of the RAMP voltage into Memory 1 so that at the completion of the pass the value stored in Memory 1 is representative of the RAMP voltage at the last found data position in that pass, and is, therefore, representative of the position of the right-hand data boundary found in that pass.

This position of the data boundary is represented by the output signal Y of Memory 1 and, therefore, when Switch Q2 is rendered momentarily conductive at the end of the pass by the applied Sync pulse, the value stored in Memory 1 is effectively copied into Memory 2 to be stored therein throughout the immediately following pass. Thus, during each pass the value in Memory 2 is representative of the right-hand data boundary found in the immediately preceeding pass. When during any pass the scanning beam traverses past the position of the previously found data boundary, the voltage of the RAMP Signal will exceed the voltage of output Signal U of Memory 2, and, therefore, Comparator 712 and its following inverting amplifier will be activated to produce the output Signal W at a 1 level representing that the stored data boundary has been passed by the scanning beam of the facsimile transmitter.

Referring in more detail to the circuitry of Data Position Memory Unit 700, it is seen that the input amplifier 710 is a simple buffer amplifier, which references the incoming RAMP Signal which is applied to its + input, to a suitable ground reference voltage level which is applied to the − input of amplifier 710. Electronic Switch Q1, as shown in Data Position Memory Unit 700 of FIG. 7 is seen to comprise a conventional field effect transistor switch. Memory 1 is seen to comprise a conventional feedback stabilized operational amplifier, generally designated 714 which has a storage capacitor 716 connected to its + input. When signal T at a high level is applied (through a diode D6) to the gate electrode of FET Switch Q1, the then existing RAMP signal is applied through FET Switch Q1 to thereby charge to its own value the storage capacitor 716 of operational amplifier 714, thereby effectively storing the then existing value of the RAMP voltage in Memory 1. Switch Q2 can be considered to be identical with Switch Q1 and Memory 2 can be considered to be substantially similar to its circuit details to Memory 1. It should be noted, referring to Memory 1 that a predetermined negative bias is applied by a resistance divider network to the − input of operational amplifier 714 of Memory 1 so that its output Y is additively biased to a slightly higher value than would be occasioned by the data boundary position value stored in Memory 1. This slight additive bias to the output of Memory 1 provides the slight overshoot of the scanning beam at data boundaries which has been previously discussed in connection with FIG. 4, thus enabling the scanning beam to more safely encompass the outlining of the real data boundaries of a data block.

We will refer now to the circuit mechanization of Mode Control Unit 704 which as shown in FIG. 7 is mechanized in exact accordance with the previously developed logical equations (1) – (12) so as to sequence the D, H, L and V flip-flops in the manner described and produce the described output signals X, R, and S and Gated Vertical Modulation of Redundancy Reduction Unit 100. As shown in FIG. 7 Mode Control Unit 704 includes the D, H, L and V flip-flops and also includes a Logic MATRIX 750 which comprise a plurality of individual logical gating networks which receive the output signal W of Data Position Memory Unit 700 and the output signals of Reception Unit 702 and also receives the output signals of the D, H, L and V flip-flops. The various logical gating networks respond to these signals to produce the desired One setting and Zero setting input signals to the individual flip-flops and also to produce the required output signals X, R, S and Gated Vertical Modulation, as well as corresponding complementary output signals.

For purposes of convenient reference each individual gating network will be identified by the name of the output signal that it produces. For example, referring to the first appearing gating network at the top of Logic Matrix 750, this gating network will be designated as the ONE D Network and is seen to be a simple logical gating network which is a direct mechanization of logical equation (1) which defines the ONE D signal for setting the D flip-flop to a 1 state. As shown in FIG. 7, within the ONE D network, the signal T (T = DATA · $\overline{\text{OL Sync}}$) is combined in a conventional OR gate with the EOF signal to produce an output signal DATA · $\overline{\text{OL Sync}}$ + EOF which serves as the required ONE D switching signal. The ONE D signal is applied through an inverting amplifier to the one set input of flip-flop D to switch the D flip-flop to a 1 state each time that the ONE D signal is at a high or 1 logic level. (The inverting amplifier is provided because it is intended that flip-flops which respond to negative triggering inputs be utilized and similar inverting amplifiers are provided for this reason before the 1 and 0 inputs respectively of each of the flip-flops). The ZERO D Network is seen to be a direct mechanization of logical equation (2) and simply applies the signal EOL directly to serve as the ZERO D signal. Similarly the ONE H and ZERO H Networks are provided as direct mechanizations with conventional AND gates and OR gates of logical equations (3) and (4) respectively. Similarly the ONE L Network and ZERO L Networks are direct mechanizations with AND and OR gates of logic equations (5) and (6); while the ONE V and ZERO V Networks are similarly direct mechanizations of logical equations (5) and (6).

The X gating network (X Network) is a direct mechanization with conventional NAND gates of logical equation 9). As shown in FIG. 7, within the X Network the V and W signals are combined in a NAND gate to produce an output Signal W · V which is in turn combined in another Nand gate with the signal $\overline{\text{H}}$ to form as the output signal of the second Nand gate the signal H + W·V which serves as the X fast control output signal of Redundancy Reduction Unit 100. The X signal is also applied through a suitable inverting amplifier within Logic-Matrix 750 to form the complementary $\overline{\text{X}}$ output signal.

Similarly the Wide Sync Signal R is formed with conventional NAND gates as a direct mechanization of logical equation (10), with the $\overline{\text{D}}$, H, L and OL Sync signals all being combined in a NAND gate whose output is inverted by a succeeding NAND gate to form the signal R = $\overline{\text{D}}$ · H · L · OL Sync which is the required value of the R signal. The R signal is also applied through an inverting amplifier to form the complementary signal $\overline{\text{R}}$.

Referring to the S gating network of Logic Matrix 750, it is seen that this network directly mechanizes logic equations (11) and (12). The Vertical Modulation Gating Signal S is formed by combining signals H and L in a NAND gate to form a signal S which is low when H and L both have 1 values and is high when either of them is low. The low level of signal S is used by the immediately following gating amplifier 760 as a 1 representing output signal, and the high level of signal S is used as a 0 representing output signal. This follows because when Signal S is high, gating amplifier 760 is rendered conductive thereby shorting the applied MOD signal to ground, while when signal S is low, transistor amplifier 760 is rendered non-conductive, thereby gating through or passing through the applied vertical modulation wave form signal MOD to be utilized at the output thereof as the Gated Vertical Modulation output signal. Thus the Gated Vertical Modulation output signal will only appear when both H and L are at their high 1 representing logic levels in accordance with the logical equation (12).

It is seen that the particular mechanization of Redundancy Reduction Unit 100, shown in FIG. 7, is specified by the state diagram flow charts of FIGS. 5 and 6 and the resultantly derived logical equations, and that this particular embodiment of Redundancy Reduction Unit 100 is constructed as a direct mechanization thereof and will, therefore, sequence the flip-flop states and the scanning beam modes of operation in the manner heretofore described in connection with FIGS. 5 and 6.

A partly block, partly circuit diagram of an alternate embodiment of Redundancy Reduction Unit 100 is shown in FIG. 9. The normal state diagram flow chart for this embodiment is shown in FIG. 10, while the starting sequence state diagram flow chart for this embodiment is shown in FIG. 11. The embodiment of FIG. 9 may be utilized if it is desired to use quite slow responding amplifiers in the deflection circuitry which responds to the X, R, and S output signals of Redundancy Reduction Unit 100. The embodiment of FIG. 9 allows extra time for amplifier response by completing all switching operations of the H and L flip-flops by the middle of the Sync period (mid-Sync) rather than at the end of the Sync period (EOL) as is done in the embodiment of FIG. 7. The embodiment of FIG. 9 also has considerable historical interest in connection with the reduction to practice of the Redundancy Reduction System.

As is indicated in the state diagram flow chart of FIG. 10, the sequence of the basic modes of operation C1, C2, A, D and B, is exactly the same as was described in connection with FIG. 5. In the alternate embodiment of FIG. 9, however, as indicated in FIG. 10, the preliminary period before each major mode, is broken down into four subsidiary portions, and the required switching of the D, H and L flip-flops is performed in successive steps throughout each preliminary period, rather than being all done at time EOL. Thus, for example, referring in FIG. 10 to the C1 mode in which the D, H and L flip-flops have the values 0, 0, 0, respectively, during the immediately following pass if data is found (DATA = 1) the system cycles to the state $\text{PRE}_1\text{-C2}$ which has exactly the same values 1, 0, 0, of the D, H and L flip-flops as in the Pre-C2 state of FIG. 5. However, as shown in FIG. 10 the $\text{PRE}_1\text{-C2}$ state is only the first of four successive preliminary states through which the D, H and L flip-flops are cycled, these states being the $\text{PRE}_1\text{-C2}$, $\text{PRE}_2\text{-C2}$, $\text{PRE}_3\text{-}$C2, and $\text{PRE}_4\text{-C2}$ states. As further indicated in FIG. 10, the $\text{PRE}_1\text{-C2}$ period is terminated by the beginning of the OL Sync pulse; the $\text{PRE}_2\text{-C2}$ period is terminated by the appearance of the Sync pulse; the $\text{PRE}_3\text{-C2}$ period is terminated at a time corresponding to the middle of the Sync pulse (mid-Sync); and the $\text{PRE}_1\text{-C4}$ period, which is the final preliminary period, is terminated at the time of end of Sync or beginning of POST Sync, corresponding to the pulse time which we have previously designated EOL.

The rules for switching the D, H and L flip-flops are basically similar to those which were described in connection with FIG. 5.

For example, referring in FIG. 10 to the preliminary periods preceding the C2 mode, and considering the switching of the D flip-flop, it is seen that the initial value of the D flip-flop (in $\text{PRE}_1\text{-C2}$) is determined by the finding of data (DATA = 1) in the present pass, and such value of the D flip-flop is maintained until the arrival of the EOL pulse at the end of $\text{PRE}_4\text{-C2}$, at which time the D flip-flop is automatically zeroed. The switching rules for the D flip-flop are therefore identical to those described in connection with FIG. 5.

Referring to the switching rules for the H flip-flop, as indicated in the PRE C2 periods of FIG. 10, the H flip-flop is initially (in $PRE_1$-C2) at the same value that it had during the previous mode (C1). However, at the time that the Sync pulse begins $(Sync)_p$, that is at the end of $PRE_2$-C2, the H flip-flop is automatically switched to its 1 state, thereby clearing any stored information at this time from the H flip-flop. Then later, at a time corresponding to the middle of the Sync pulse (mid-Sync) if D = 1 signifying that data has been found during the pass, the H flip-flop will be zeroed. Thus immediately after mid-Sync (during $PRE_4$-C2) the H flip-flop by this somewhat different sequence will nevertheless have the same required final values corresponding to the copying thereinto of the reverse value of the D flip-flop. Such copying is accomplished by a time corresponding to the middle of the Sync pulse (mid-Sync). It will be noted that in this procedure for copying the value of the D flip-flop reversed into the H flip-flop, the H flip-flop is temporarily cleared of any information during the first half of the Sync pulse (i.e. during $PRE_3$-C2) and therefore the H flip-flop cannot be used directly in the formation of output signals without some special allowance for its lack of information during the $PRE_3$-C2 period.

Referring now to the switching rules for the L flip-flop, as is indicated in FIG. 10 the L flip-flop is, as before, zeroed in response to H and D both at their 1 levels (H·D) and is switched to a 1 value in response to H = 0 and D = 1 ($\bar{H}$·D). However, as indicated in FIG. 10, the switching of the L flip-flop is accomplished in response to the beginning of the OL Sync pulse (i.e. at the end of $PRE_1$-C2), rather than at time EOL as was done in connection with FIG. 5.

Reviewing and summarizing the sequence of times at which the various flip-flops D, H and L are switched, as indicated in FIG. 10, the L flip-flop is switched in accordance with its switching rules at a time corresponding to the beginning of the OL Sync pulse. Next, the H flip-flop is automatically switched to its 1 state, in response to the beginning of the Sync pulse. Then the H flip-flop is re-zeroed at a time corresponding to the middle of the Sync pulse (mid-Sync), if D = 1, indicating that data has been found. And finally, the D flip-flop is zeroed at a time corresponding to the end of the Sync pulse (EOL) thereby completing the cycling of the D, H and L flip-flops in the preliminary periods and completing their transition to their final mode state. It should be understood that the same switching rules apply to all of the major modes and their corresponding preliminary periods, as may readily be verified by referring to FIG. 10.

The alternative embodiment of FIG. 9 has been provided with a starting sequence as shown in FIG. 11 which is very similar to the starting sequence of FIG. 6. As shown in FIG. 11 when the power is applied to the unit, the D, H, L and V flip-flops can be presumed to be in undetermined (either 1 or 0) states as indicated by X's beneath the corresponding flip-flop designations in the first rectangular box of FIG. 11. In response to the end of frame signal (EOF) the H, L and V flip-flops are automatically zeroed. The D flip-flop can be allowed to remain in an undetermined state at this time. In response to the application of the MANUAL START pulse, the end of frame detector 61 is switched to its alternate state producing signal EOF at low level ($\overline{EOF}$) and thereby permitting the first pass to begin. During the first pass, because the calibration strip 47 is being scanned, data will be found (DATA = 1) and therefore the system will cycle to the values 1, 0, 0, 0 respectively of the D, H, L and V flip-flops, so that the system has been obviously forced into a $PRE_1$-C2 state. This $PRE_1$-C2 state will cycle in normal fashion to a C2 state or mode, which has the values 0, 0, 1, 0 respectively for the D, H, L and V flip-flops, thereby initiating the second pass of the system during this start-up sequence. During the second pass, data is assuredly found because the black-white calibration strip 47 is being read and therefore, the C2 mode is cycled back once more to the $PRE_1$-C2 state. However, on such return to the $PRE_1$-C2 state, the L flip-flop now has the value of 1 so that the sequence of the D, H and L flip-flops is 1, 0, 1 (D·$\bar{H}$·L) rather than 1, 0, 0, as it was previously. This unique 1, 0, 1 (D·$\bar{H}$·L) sequence of the D, H and L flip-flops in $PRE_1$-C2 can be used in conjunction with the OL Sync pulse to uniquely signal that the second pass has been completed, and therefore the signal D·$\bar{H}$·L may be used at this time to switch the V flip-flop to its 1 value. Thereafter, after the completion of the second pass the V flip-flop has a 1 value and maintains this 1 value throughout all the normal operations until the completion of the full frame transmission.

Having completed a discussion of the state diagram flow charts of FIGS. 10 and 11, we can now examine in detail the manner in which the described switching operations are mechanized in the alternative embodiment of RRU 100 which is shown in FIG. 9. For purposes of convenient references, the logical equations which define the operation and mechanization of the embodiment of FIG. 9 are supplied immediately below:

---

LOGIC EQUATIONS FOR EMBODIMENT OF FIG. 9

FLIP-FLOP SWITCHING EQUATIONS
(1a)  ONE D = DATA · OL Sync
(2b)  ZERO D = POST Sync
      note: beginning of POST Sync = EOL
(3a)  ONE H = $(Sync)_p$
(4a)  ZERO H = $EOF + (D · Sync)_{p\ del.\ mid\ sync}$
(5a)  ONE L = $(\bar{H} · D · OL\ Sync)_B$
(6a)  ZERO L = $(H · D · OL\ Sync)_p$ + EOF
(7a)  ONE V = $D · \bar{H} · L · (OL\ Sync)_p$
(8a)  ZERO V = EOF
FAST CONTROL SIGNAL
(9a)  X = H + W V
WIDE SYNC CONTROL SIGNAL
(10a) R = D · H · L + D · L · OL Sync (approximate)
VERTICAL MODULATION GATING SIGNAL
(11a) S = H · L
GATED VERTICAL MODULATION
(12a) GATED VERTICAL MODULATION = H · N · MOD

---

In addition to the logical equations listed above there are also logical equations which define the switching of additional flip-flops, the flip-flop K and the flip-flop N which are utilized in the embodiment of FIG. 9. These flip-flops are, however, collateral and subsidiary in the operation of the RRU, and will be later discussed in connection with the detailed examination of the manner in which the WIDE Sync R signal is formed in the operation of the embodiment of FIG. 9.

It is seen, referring to the above-listed logical equations (1a) through (12a) that the flip-flop switching equations are merely direct statements of the flip-flop switching rules which have been developed above from a consideration of the state diagram flow charts of FIGS. 10 and 11. To clarify the nomenclature utilized in equation (4a) the term ZERO H = EOF + $(D · Sync)_{p\ del.\ mid\ sync}$, refers to a pulse which is produced when D and Sync coincide and which is delayed until the time mid sync. In the same manner, referring to equation (5a) the term (H · D · OL Sync)$_p$ refers to a pulse signal which is produced at the beginning of OL Sync when $\overline{H}$ and D are both one. Similar nomenclature is used in the other logical equations.

Referring still to logical equations (1a) through (12a) it is seen that equations (9a), (11a) and (12a) which define the X signal, the S signal, and the Gated Vertical Modulation signal respectively, are identical to the corresponding logical equations 9, 10 and 12 previously developed for the embodiment of FIG. 7, and as will be clear from an examination of the embodiment of FIG. 9 are similarly mechanized to form the X, S, and Gated Vertical Modulation output signals of RRU 100 of FIG. 9.

The logical equation (10a) for the Wide Sync Control Signal R is, as indicated, an approximate logical equation for the formation of signal R at time OL Sync. The complete logical equation would have additional terms which would not be relevant during the time duration of OL Sync. OL Sync overlaps the periods (during the duration of Sync) in which the Wide Sync Control Signal R is effective in controlling the duration of the Sync pulse then being formed. It is seen, referring to logical equation (10a) that during the time duration of OL Sync the effective term thereof would be the term $\overline{D}$ H L and that therefore the logical equation for signal R would reduce at that time to the same form as that which appears in logical equation (10) for the embodiment of FIG. 7. It should be noted, however, that the manner in which the signal R is formed in the embodiment of FIG. 9 is quite complicated and is significantly different from the mechanization of the embodiment of FIG. 7. It will be described in detail hereafter.

Referring now to FIG. 9 in which the alternate embodiment of RRU 100 is shown in detail, it is seen that this embodiment employs the flip-flops D, H, L and V which are switched to their 1 or 0 states in accordance with the logical equations (1a) through (8a) and are utilized in the formation of the output signals of RRU 100 in accordance with logical equations (9a) through (12a). The embodiment of FIG. 9 also includes the two flip-flops K and N which are collateral and subsidiary flip-flops that are utilized in the formation of the R signal.

The embodiment of FIG. 9, it is seen, utilizes four input conditioning amplifiers AR 1, AR 2, AR 3, and AR 4. Amplifier AR 1 receives the RAMP signal and its corresponding low or ground return and produces a corresponding RAMP output signal which is referenced to the local ground of Redundancy Reduction Unit 100. Amplifier AR 4 operates similarly on the vertical modulation signal MOD. Amplifier AR 2 includes an OR gate in which the incoming POST Sync, PRE Sync and Sync pulses are logically summed to produce, as an output from amplifier AR 2, the overlapping Sync signal, OL Sync. Amplifier AR 3 is arranged to operate as a precision level detector which is designated as the Data Level Detector, and as seen in FIG. 9, receives the video signal V$_0$ and its ground return and produces the output signal T at a high or a 1 level whenever signal V$_0$ has a voltage above a predetermined level, thereby indicating that data has been found in the instant pass.

The Data Level Detector AR 3, as shown in FIG. 9, receives the signal OL Sync as an inhibit input thereto so that its output signal T has the value DATA · $\overline{OL}$ Sync. As shown in FIG. 9 this signal is applied both to switch Q1 to order the reading of the RAMP signal into memory 1 and is also applied as the one setting ONE D signal, through an appropriate inverting amplifier A4 to the 1 input of flip-flop D. As further shown in FIG. 9 the POST Sync signal is tapped off and utilized as the ZERO D input to flip-flop D, being applied thereto through a suitable inverting amplifier A0. It is thus seen in FIG. 9 that the circuitry for forming the ONE D and ZERO D input signals is a direct mechanization of logic equations (1a) and (2a) as has been verified by the above described signal tracing of the corresponding inputs to the 1 and 0 input terminals of flip-flop D.

In the same manner, the input signals to the 1 and 0 inputs of each of the other flip-flops, and also the signals which form the X, R, S, and Gated Vertical Mod output signals of RRU 100 can be readily signal traced in FIG. 9 to verify that they are formed as direct mechanizations of the corresponding logical equations (1a) through (12a).

As shown in FIG. 9, such mechanizations are for the most part accomplished in straightforward manner using, as elements of the logic, a plurality of inverting amplifiers A1 through A12, a plurality of Nand gates M1 through M15, an AND gate AN1, a delay multivibrator DMV1 which has a predetermined delay between reception of an input pulse and production of a triggering transition, and a plurality of one-shot multivibrators SH1 through SH3 which respond to the leading edge of an incoming pulse to produce an immediate short output pulse.

As an example, referring to the top portion of FIG. 9, the formation of signal W by processing of the RAMP signal through AR 1, switch Q1 and memory 1, switch Q2 and memory 2, comparator amplifier AR5, and inverting amplifier A8 is seen to be identical with the formation of signal W in Data Position Memory Unit 700 of FIG. 7, and the subsequent formation of the fast control signal X by the processing of signal W through Nand gate M8, and Nand gate M10 is seen to be a similar direct mechanization of logic equation (9a).

In general the formation of each of the other flip-flop switching signals and the formation of the required output signals in accordance with their governing logical equations can be verified by simple and obvious signal tracing in FIG. 9 and will not be further discussed herein. It will be noted in FIG. 9 that all pertinent signal lines have been labeled with the logical function appearing thereon so as to facilitate such signal tracing and verification.

There are, however, a few areas in FIG. 9 in which some additional explanation is desirable to verify the nomenclature utilized or the manner in which the operation is accomplished, and these areas will be discussed immediately below:

Referring to the formation of the output signal GATED VERTICAL MOD, it is seen that this signal is formed at the output of an amplifier A-11 which receives the vertical modulation gating signal S from Nand gate M-11 which receives as input thereto the signals H and L. It should be recognized that amplifier A-11 operates in the same manner and can be considered to be identical to amplifier 760 of logic Matrix 750 as shown in FIG. 7, so that the GATED VERTICAL MODULATION signal represents, as required, the function H · L · MOD.

We have previously described the manner in which the D flip-flop is initially zeroed in response to the POST Sync pulse and is thereafter set to its 1 value by the signal T (T = DATA · $\overline{\text{OL Sync}}$) whenever data is found in the instant pass. We shall now examine the manner in which the value in the D flip-flop is copied reversed into the H flip-flop at a time corresponding to the middle of the Sync pulse (mid Sync). As shown in FIG. 9, the H flip-flop is automatically switched to its 1 state in response to the beginning of the Sync pulse (Sync)$_p$ This is done as shown in FIG. 9 by leading the Sync pulse through the pair of inverting amplifiers A2 and A5 to trigger the one-shot multi-vibrator SH1 to issue a corresponding short output pulse (Sync)$_p$ which is utilized as the ONE H switching signal to flip-flop H. The Sync signal from amplifier A5 is also applied to an input of the Nand gate M1 which receives the output signal D at its other input so that the Sync pulse effectively samples or strobes the value of D to form a triggering signal at the output of Nand gate M1 which will be produced only when Sync and D = 1 are coincident. This triggering pulse from Nand gate M1 is applied to delay multi-vibrator DMV 1 which produces a delayed negative transition at a time corresponding to the middle of the sync pulse, which triggers the succeeding one-shot multi-vibrator SH2 to produce a corresponding short output pulse G$_p$ which is applied to one input of Nand gate M5 which receives signal $\overline{\text{EOF}}$ at its other input. It will be recognized that the pulse signal G$_p$, from the SH2 one-shot, is a signal which occurs only if D = 1 when the Sync pulse arrives and is delayed so as to be produced at a time corresponding to mid Sync, and therefore it is evident that G$_p$ = (D · Sync)$_{p\ del.\ ms}$. The output signal of Nand gate M5 is the required ZERO H signal (ZERO H = $\overline{\text{EOF}}$ + (D · Sync)$_{p\ del.\ ms}$) which is applied to a suitable inverting amplifier A9 to trigger the 0 input of flip-flop H at time of mid Sync.

The second area in which considerable explanation is required is the formation of the WIDE Sync or R signal. It is evident from examination of the preliminary period of MODE D in FIG. 10 that what we should like to do is to form the signal $\overline{D}$ · H · L and utilize it as the WIDE Sync signal R throughout the OL Sync period so that it will overlap the central Sync period and thereby order the widening of the Sync pulse during the Sync period. As indicated in FIG. 10 there is a problem with such a direct approach for the embodiment of FIG. 9, for the reason that during the first half of the Sync pulse (during PRE$_3$-D) the 1 value of the H flip-flop does not represent significant information but instead merely represents the automatic clearing to a 1 value of the H flip-flop during this period. Thus the signal $\overline{D}$ · H · L would not be unique or significant during the PRE$_3$-D period as shown for example by the fact that the same configuration is found during the PRE$_3$ - A period and Pre$_4$ - A period. We therefore come to the conclusion that in order to form a signal $\overline{D}$ H L which will actually uniquely and significantly define the required output signal R, what we should like to do is to freeze or store the values of the D, H, and L flip-flops as they appear in the PRE$_1$- D period and use these stored values to form the required signal $\overline{D}$ · H · L throughout the OL Sync period. We further note that it is not necessary to store the value of the L flip-flop because it is constant throughout the PRE D and D periods and therefore we can use the normally existing value of the L flip-flop.

With this game plan in mind we can return to an examination of FIG. 9 to see how it is implemented in the formation of the WIDE Sync R signal. Referring to flip-flop K it is seen that it is zeroed during each pass in response to the signal (D · OL Sync)$_p$ which is applied thereto by one-shot SH 3 in response to the function D · OL Sync received from Nand gate M2. Flip-flop K is switched to its 1 state at the end of OL Sync as OL Sync drops to a low value and thereby triggers the 1 input of flip-flop K. Thus, in any pass, if data is not found (D = 0), flip-flop K will be left in a 1 state and therefore the output signal of flip-flop K is defined by K = $\overline{D}$ for the period of OL Sync. Thus it can be said that the value $\overline{D}$ is stored in flip-flop K during OL Sync to produce the corresponding output signal K = $\overline{D}$ during that period.

In the same manner, referring to flip-flop N, we see that flip-flop N is switched to a 1 state in response to a switching signal ONE N = $\overline{H}$·$\overline{D}$·(OL Sync)$_p$ and is not zeroed until the beginning of the next OL Sync in response to the switching signal ZERO N = H · (OL Sync)$_p$. If flip-flop N is switched to a 1 state at the beginning of a first OL Sync period, it is clear that it will be automatically zeroed at the beginning of the next OL Sync pulse. The reason that this is true is that if $\overline{H}$ · $\overline{D}$ exists during the beginning of the OL Sync period, the zero value of the D flip-flop will be copied reversed into the H flip-flop, so that the signal H = 1 will exist at the beginning of the next OL Sync period and will thereby automatically zero the N flip-flop. Considering the first OL Sync period, it can be said that the function $\overline{H}$ · $\overline{D}$ has been stored in flip-flop N during the OL Sync period. The signal N = $\overline{H}$ · $\overline{D}$ is applied to one input of a Nand gate M14 which receives OL Sync at its other input to form a corresponding output signal $\overline{\overline{H} \cdot \overline{D} \cdot \text{OL Sync}}$. This latter signal is applied as one input to a Nand gate M15 whose other inputs are K = $\overline{D}$, and L. The output of Nand gate M15 is applied to an inverting amplifier A12 to produce the WIDE Sync signal R which is seen to have a value (approximate) equal to the AND function of the inputs to Nand gate M15, so that we can write that:

$$R = \overline{D} \cdot L \cdot \overline{\overline{H} \cdot \overline{D} \cdot \text{OL Sync}}$$

Reducing this logic equation in conventional manner, we can write:

$$R = \overline{D} \cdot L \cdot [H + D + \overline{\text{OL Sync}}]$$

$$R = \overline{D} \cdot H \cdot L + \overline{D} \cdot L \cdot \overline{\text{OL Sync}}$$

at time OL Sync, this reduces to:

$$R = \overline{D} \cdot H \cdot L \cdot \text{OL Sync}$$

It is therefore seen upon completion of the logic reduction that R = $\overline{D}$ · H · L + $\overline{D}$ · L · $\overline{\text{OL Sync}}$ which reduces to the form $\overline{D}$ · H · L · OL Sync during the OL Sync period. It has therefore been demonstrated that the signal R is formed albeit in a somewhat complex manner, as a mechanization of its logic equation (10$a$) and will therefore act in the required manner to widen the Sync pulse during the PRE D periods.

The operation of the alternate embodiment of RRU 100 shown in FIG. 9 has now been covered, and the description of RRU 100 of FIG. 9 is therefore now completed.

Referring now to FIG. 8 it is desirable to briefly describe the manner in which the deflection and Sync generation circuitry of the facsimile transmitter may be adapted to respond to the control signals which are issued by a Redundancy Reduction Unit as illustrated in either FIG. 7 or FIG. 9. We will examine the manner in which exemplary deflection and Sync generation circuitry responds to the fast control signal X, the WIDE Sync control signal R, and the VERTICAL MODULATION signal. We will, for purposes of clarity, also briefly comment on the manner in which such circuitry responds to the special ADVANCE signal which is supplied to it by the ABC unit to order a special downward increment or bias to the vertical deflection voltage after the first two calibration scans have been completed.

FIG. 8 shows an exemplary horizontal integrator generally designated 802 which is alternately driven by applied charging signals and reset commands to repetitively generate the ramp wave form of the horizontal deflection voltage signal RAMP. FIG. 8 also shows an exemplary embodiment of a vertical integrator generally designated 804 which is driven by applied charging signals and reset or discharge commands to repetitively generate the staircase wave form of the vertical deflection voltage. As indicated in FIG. 8, switching circuitry which is associated with the horizontal integrator generates the Sync pulse and allows control of the width of the Sync pulse by WIDE Sync signal R. Switching circuitry which is associated with the vertical integrator 804 generates the end of frame or EOF signal.

As shown in FIG. 8, a voltage reference signal $E_{Ref}$ is applied through a pair of series connected input resistors to an input of horizontal integrator 802 to thereby establish a normal charging rate into the horizontal integrator 802 thereby establishing a corresponding normal slope of the horizontal ramp deflection voltage signal RAMP.

The fast control signal X is able at its high or 1 representing logic level to increase the slope or deflection rate of the horizontal ramp signal by increasing the charging rate of horizontal integrator 802. Each time signal X goes to its high level it renders an electronic switch 830 conductive to thereby short out of circuit one of the series connected charging resistors to the input of horizontal integrator 802 thereby increasing the charging rate of integrator 802 and causing a corresponding increase in the slope of the ramp output of integrator 802.

The discharge or reset of the horizontal integrator 802 at the end of the line is controlled by associated switching circuits. As shown in FIG. 8, the signal RAMP is applied to a level detector 806 which responds to the RAMP signal when it reaches a sufficiently high voltage level corresponding to the end of the line to produce an output signal which is applied to switch a latch or flip-flop S to its 1 state to thereby produce a 1 valued output signal which serves as the signal Sync. In order, to establish the duration of the Sync pulse, the signal Sync is applied as shown in FIG. 8 to an input of an integrator generally designated Sync Width Integrator 808 which operates to establish the duration or width of the Sync pulse. Integrator 808 charges at a fixed rate in response to the charging current supplied by the Sync signal. The output signal of integrator 808 is therefore an approximately linearly rising ramp which rises until it reaches a predetermined level which is detected by a level detector 810 which responds thereto to zero or reset the S flip-flop to thereby terminate the high or 1 level of the corresponding Sync pulse, thus establishing the effective duration of the Sync pulse. The duration of each Sync pulse, it is seen, is therefore determined by the charging rate of integrator 808 which is in turn determined by the values of its input charging resistor 812 and the effective capacity of its series connected feedback capacitors 814 and 816.

As shown in FIG. 8, feedback capacitor 814 has an electronic switch 818 shunted across it which is under the control of the applied WIDE Sync control Signal R. When signal R has a high or 1 representing logic level, electronic switch 818 becomes conductive and thereby shunts capacitor 814 out of circuit, so that the effective capacity of the feedback path of integrator 808 is increased so as to thereby decrease the integrator's charging rate and thus lengthen the duration of the Sync pulse. This is the manner in which any Sync pulse may be widened in response to each application of signal R at its high level, during the period in which the corresponding Sync pulse is formed.

It is clear, referring to FIG. 8 that the Sync pulse, whatever its length, is also effective in discharging or resetting the horizontal integrator 802 at the end of line. This is accomplished by applying each Sync pulse to the electronic switch 820 which in response thereto forms a conductive shunt path across the feedback capacitor 322 of horizontal integrator 802, thereby discharging and resetting horizontal integrator 802 during the duration of each Sync pulse.

Referring now in FIG. 8 to vertical integrator 804, it is seen that this integrator is formed using the output and − input of operational amplifier 832. The + input of amplifier 832 is free and available for input thereto of reference voltages or currents which will be summed within amplifier 832 with the output of integrator 804. As shown in FIG. 8, integrator 804 is charged during the duration of each Sync pulse, each Sync pulse being applied to render conductive an electronic switch 840 which admits charging current from a voltage reference $E_{Ref}$ through an input resistor to the input of vertical integrator 804 during the duration of the corresponding Sync pulse. The vertical intergrator 804 is therefore charged step-wise in response to each Sync pulse, thereby establishing a line to line vertical deflection or spacing of the transmitter scanning beam. It is clear that when a Sync pulse is widened by signal R at a high level, more charging current will be admitted to vertical integrator 804 during the duration of such wide Sync pulse thereby occasioning a corresponding extra large downward step or deflection of the scanning beam of the transmitter.

When the vertical integrator 804 is fully charged to a level corresponding to completion of scanning of the full document, this is detected by a level detector 842 which responds thereto by switching its output signal EOF to a high level to indicate the end of frame condition. Signal EOF is applied to an electronic switch 844 which responds thereto to conductively shunt out the feedback capacitor of vertical integrator 804 to thereby discharge and reset integrator 804 at end of frame.

All the various biases and modulations which are to be applied to the vertical deflection voltage are supplied to the + input of operational applifier 832 to be summed therein with the output of vertical integrator 804. The fast control signal X effects a one line ahead bias by rendering conductive an electronic switch 850 which admits current from the voltage reference $E_{Ref}$ through an input scaling resistor 852 to the + input of operational amplifier 832. The GATED VERTICAL MODULATION signal is also mixed or summed into the + input of operational amplifier 832 by being applied thereto through a scaling resistor 854. The AD- VANCE signal is able to effect its biasing or advancing of the vertical deflection voltage by rendering a normally conductive electronic switch 856 nonconductive, to remove current drain from voltage reference $E_{Ref}$ through a scaling resistor 858 to the same + input of operational amplifier 832. All of these input signals are summed with the output of vertical integrator 804 to create the corresponding biases of the vertical deflection voltage.

Discussion of the operation of Redundancy Reduction Unit 100 and its cooperation with the facsimile transceiver has now been completed.

What is claimed as new is:

1. In a document scanning system employing a predetermined fast search velocity for searching the document and a predetermined slow scan velocity for reading the document, the method of performing a single wide area fast search pass for detecting presence of data anywhere in a wide band document area composed of a predetermined plurality of vertically successive narrow horizontal bands of predetermined width of the document, said method comprising the steps of:
   (a) Directing at a selected one of the predetermined plurality of successive horizontal bands of the document, a narrow spot of radiation having a spot width approximating the width of a single narrow horizontal band of the document;
   (b) Horizontally sweeping said spot of radiation across said document in a single fast search pass at a predetermined fast search velocity;
   (c) During said single fast search pass, rapidly deflecting the spot of radiation up and down vertically across the predetermined plurality of successive narrow horizontal bands to sweep the spot in a vertically reciprocating path across the predetermined plurality of successive horizontal bands;
   whereby the spot of radiation during the single wide fast search pass, narrowly illuminates any data in any of the predetermined plurality of successive horizontal bands of the document so as to detect the presence of such data in the wide band area.

2. The method of claim 1 which further includes the step of:
   Only if no data is illuminated during the single wide fast search pass, performing a second wide fast search pass of the spot of radiation over a second wide band document area contiguous with the first wide band area.

3. The method of claim 2 which further includes the step of:
   continuing to perform successive wide fast search passes of the radiation spot over corresponding vertically successive wide band document areas until data is illuminated in one of the wide search passes;
   whereby successive vertically contiguous data-free wide band areas of the document can be rapidly searched and skipped over until data is illuminated in one of the wide band areas.

4. The method of claim 1 which further includes the following step:
   When any data is illuminated by the spot of radiation during the single wide fast search pass, thereafter repetitively initiating respectively corresponding horizontal passes of the spot of radiation over the same narrow horizontal bands of the wide band area until data is illuminated by the spot or radiation during one of the respective horizontal passes;
   whereby the spot of radiation is able during the successive horizontal passes to locate and read the data detected during the preceding wide fast search pass across the wide band area.

5. The method of claim 4 which further includes the step of:
   During a horizontal pass, continually storing in a memory element information representative of the horizontal position of the last data element illuminated in the pass;
   retaining the stored information in the memory element during the immediately following horizontal pass;
   whereby the memory element retains information representing the horizontal position of the data boundary found in the pass throughout the immediately following pass to thereby define a proposed data boundary for the immediately following pass.

6. The method of claim 5, wherein said step of storing information in a memory element includes the following steps:
   (a) Each time the radiation spot illuminates a data element during the horizontal pass of the spot across the document, recording corresponding information representative of the horizontal position of the illuminated data element in the memory element and replacing previously recorded information therewith;
   whereby at the completion of the pass the memory element retains information representative of the horizontal position of the last data element illuminated in the pass.

7. The method of claim 5, wherein said step of retaining the stored information in the memory element includes the step of:
   at the completion of the horizontal pass, transferring the information stored in the memory element from a primary division of the memory element to a secondary division of the memory element to be retained therein;
   whereby the information obtained in the pass may be retained in the secondary division of the memory element throughout the immediately following horizontal pass and the primary division of the memory element is freed for storage of new position information during the same immediately following pass.

8. The method defined by claim 5 which further includes the step of:
   during each horizontal pass, continually reading the information retained in the memory element and increasing the velocity of the radiation spot to high search velocity whenever the spot traverses horizontally beyond the proposed data boundary defined by the information retained in the memory element.

9. The method defined by claim 8 which further include the step of:
   deflecting the spot to the immediately following narrow band whenever the velocity of the spot is increased to high search velocity during a pass across a narrow horizontal band;
   and completing the pass in the immediately following narrow band at the high search velocity;
   whereby the spot is able to detect the most extreme of the data boundaries in both the narrow band and the immediately following narrow band, to thereby define an extreme proposed horizontal data boundary for the immediately following pass.

10. The method of claim 4 which includes the step of beginning at least the first of the successive horizontal passes of the radiation spot as a relatively slow scan pass across the corresponding horizontal band at a predetermined slow scan velocity.

11. The method of claim 10 which includes the step of:
during any of the successive horizontal passes of the radiation spot which is begun at slow scan velocity, increasing the slow scan velocity of the radiation spot to the high search velocity whenever the radiation spot traverses past the horizontal position defined by the last data element illuminated in the preceding pass,
whereby the spot searches at high horizontal search velocity the areas beyond the extreme horizontal boundary of a block of data established on the document to thereby shorten the time required to scan the document.

12. The method of claim 11 which includes the step of:
deflecting the spot to the immediately following narrow band whenever the velocity of the spot is increased to high search velocity during a pass across a narrow horizontal band;
and completing the pass in the immediately following narrow band at the high search velocity;
whereby in a single pass the spot is able to detect the most extreme of the data boundaries in both the narrow band and the immediately following narrow band to thereby find an extreme proposed data boundary for an immediately following pass of the radiation spot.

13. The method of claim 10 which further includes the steps of:
during periods in which the spot of radiation is performing relatively slow scan passes over the document, generating and transmitting to a remote fascimile receiver-recorder video signals representative of the shade of document areas scanned by the spot of radiation.

14. The method of claim 13 which further includes the step of;
suppressing recording of video signals by the facsimile receiver-recorder during periods corresponding to the periods in which the radiation spot is performing relatively fast search passes over the document.

15. The method of claim 14 in which said suppressing step comprises the step of suppressing transmission of the video signals to the receiver during periods in which the radiation spot is performing fast search passes.

16. In a document scanning system employing a predetermined fast search velocity for searching the document and a predetermined slow scan velocity for reading the document, the method of performing a single wide area fast search pass for detecting presence of data anywhere in a wide band document area composed of a predetermined plurality of vertically successive narrow horizontal bands of predetermined width of the document, said method comprising the steps of:
(a) Starting at the beginning of a selected one of the predetermined plurality of successive horizontal bands of the document, and horizontally scanning across said document in a single fast search pass at the predetermined fast search velocity;
(b) During said single fast search pass, simultaneously rapidly scanning up and down vertically across the predetermined plurality of successive narrow horizontal bands to scan in a resultant vertically reciprocating path across the wide band, whereby during the single wide area fast search pass, the scan is able to detect any data in the wide band area;
(c) If any data is scanned during the single wide fast search pass, thereafter beginning a series of successive respectively corresponding horizontal passes over each of the narrow horizontal bands of the wide band area until data is scanned during one of the respective horizontal passes;
whereby successive horizontal scanning passes are able to locate data detected during the preceding wide fast search pass across the wide band area.

17. The method of claim 16 which includes the steps of:
moving the scan to the immediately following narrow band whenever the velocity of the scan is increased to high search velocity during a pass across a narrow horizontal band;
and
completing the pass in the immediately following narrow band at the high search velocity;
whereby in a single pass the scan is able to detect the most extreme of the data boundaries in both the narrow band and the immediately following narrow band to thereby find an extreme proposed data boundary for the immediately following pass.

18. The method of claim 16 which further includes the step of:
when no data is scanned during the single wide fast search pass, performing a second wide fast search pass over a second wide band document area contiguous with the first wide band area.

19. The method of claim 18 which further includes the step of:
continuing to perform successive wide fast search passes over corresponding vertically successive wide band document areas until data is scanned in one of the wide search passes;
whereby successive vertically contiguous data-free wide band areas of the document can be rapidly searched and skipped over until data is scanned in one of the wide band areas.

20. The method of claim 16 which includes the step of beginning at least the first of the successive horizontal passes as a relatively slow scan pass across the corresponding horizontal band at a predetermined slow scan velocity.

21. The method of claim 20 which includes the step of:
during any of the successive horizontal passes which is begun at slow scan velocity, increasing the slow scan velocity whenever the scan traverses past the horizontal position defined by the last data element scanned in the preceding pass;
whereby the scan searches at high horizontal search velocity the horizontally data-free areas beyond the extreme horizontal boundary of a block of data established on the document to thereby shorten the time required to scan the document.

22. The method of claim 20 which further includes the step of:
during periods in which the scan is moving at a relatively slow scan velocity over the document, generating and transmitting to a facsimile receiver video signals representative of data contained in document areas being scanned.

23. The method of claim 22 which further includes the step of:

Suppressing recording by the facsimile receiver during periods corresponding to the periods in which the transmitter scan is moving at relatively fast search velocity over the document.

24. The method of claim 22 in which said suppressing step comprises the step of suppressing transmission of the video signals to the receiver during periods in which the scan is moving at fast search velocity.

25. In a facsimile transmitter-receiver scanning system employing a predetermined fast search velocity of the transmitter scan for searching a document and a predetermined slow scan velocity of the transmitter scan for reading the document, the method of performing a scanning pass across a document and recording data read therein which comprises the steps of:

(a) Beginning a generally horizontal transmitter scanning pass across the document at the slow scan velocity;

(b) During the generally horizontal transmitter scanning pass, increasing the velocity of the transmitter scan to high search velocity when the scan traverses horizontally beyond a proposed data boundary between data containing areas and data free areas of the document and completing the pass at the high search velocity;

(c) In synchronism with the beginning of the slow scan velocity transmitter scan, beginning a horizontal receiver scan over a recording medium at the corresponding slow scan velocity;

(d) Maintaining the receiver scan at the slow scan velocity throughout a receiver pass corresponding to the transmitter pass to record document data information transmitted to the receiver during the slow scan period of the transmitter scanning pass;

(e) Suppressing data recording by the facsimile receiver during periods corresponding to periods in which the transmitter scan is moving at high search velocity over the document; and (f) Synchronously resetting the receiver scan to a starting position at the completion of the transmitter scanning pass so as to synchronously begin the next successive scanning passes of the receiver and transmitter;

whereby the receiver scan remains in synchronism with and performs recording during the slow scan velocity portion of the transmitter scanning pass and has its recording suppressed when the receiver scan loses synchronism during the high search velocity portion of the transmitter scanning pass, both scans being restored to synchronism at the beginning of their next successive passes.

26. The method of claim 25 wherein said step of suppressing data recording by the receiver comprises the steps of:

Suppressing transmission by the transmitter of document data information originated when the transmitter scan is traversing the document at high search velocity;

Whereby velocity change information need not be transmitted to the receiver to maintain synchronism between transmitter and receiver.

27. The method of claim 25 wherein the step of beginning a generally horizontal transmitter scanning pass comprises the steps of:

directing a narrow spot of radiation at a beginning position upon the surface of the document;

and beginning horizontally sweeping the spot of radiation across the document at the slow scan velocity.

28. The method of claim 25 wherein said step of increasing the velocity of the transmitter scan to high search velocity comprises:

increasing the transmitter slow scan velocity to the high search velocity when the scan traverses past a horizontal position defined by the last data element scanned in an immediately preceding pass;

whereby the transmitter scan searches at high horizontal search velocity the areas beyond the proposed horizontal boundary of data established on the document to thereby shorten the time required to scan the document.

29. The method of claim 25 which further includes the following steps:

if no data is traversed by the transmitter scan during the generally horizontal transmitter scanning pass, beginning a successive transmitter pass as a single wide area fast search pass for detecting presence of data anywhere in a wide band document area vertically beneath the path of the generally horizontal transmitter scanning pass, said step comprising the steps of: Horizontally scanning the transmitter scan across the document in a single fast search pass at a predetermined fast search velocity;

during the single fast search pass, simultaneously rapidly scanning up and down vertically across the wide band area to scan in a resultant vertically reciprocating path across the wide band area;

whereby during the single wide fast search pass, the transmitter scan is able to detect the presence of data in the wide band area.

30. The method of claim 29 which further includes the step of:

when no data is scanned during the single wide fast search pass, performing a successive wide fast search pass over a second wide band document area contiguous with the first wide band area;

whereby successive vertically contiguous data-free wide band areas of the document can be rapidly searched and skipped over until data is scanned in one of the wide band areas.

31. The method of claim 25 wherein said step of beginning a generally horizontal transmitter scanning pass across the document includes the step of beginning the horizontal scanning pass at a predetermined vertical line position of the document and initially scanning horizontally across the document at the predetermined line position at the slow scan velocity;

and said step of increasing the velocity of the transmitter scan to high search velocity further includes the step of vertically moving the scan to a vertically successive line position of the document in synchronism with the increase in velocity of the scan and completing the generally horizontal transmitter pass across the document at the successive line position of the document at the high search velocity;

whereby in a single generally horizontal pass the transmitter scan is able to detect the most extreme of the data boundaries in both the initial line and the successive line of the document to thereby find an extreme proposed data boundary for the next successive pass across the document.

32. The method of claim 31 which further includes the step of;

if data is traversed by the scan during the horizontal scanning pass, thereafter beginning a successive generally horizontal transmitter scanning pass across the document at the slow scan velocity at the successive line position of the document;

whereby the successive transmitter scan is begun at the same line position which was traversed during the high search velocity portion of the preceding generally horizontal transmitter pass.

33. The method of claim 31 wherein said step of maintaining the receiver scan at slow scan velocity throughout a corresponding pass includes the further step of:

maintaining the receiver scan throughout its pass at the same vertical line position at which it began its pass;

whereby vertical deflection information need not be transmitted to the receiver to reflect temporary deflection of the transmitter scan when it makes a transition to high search velocity.

34. In a facsimile transmitter-receiver scanning system employing a predetermined fast search velocity of the transmitter scan for searching the document and a predetermined slow scan velocity of the transmitter scan for reading the document, the method of performing a scanning pass across the document which comprises the steps of:

(a) Before the beginning of the pass, recording in a memory element information representing the horizontal position of a proposed extreme horizontal boundary between data containing areas and data free areas of the document;

(b) Beginning a horizontal scanning pass across the document at the slow scan velocity;

(c) During the horizontal scan continually reading the information stored in the memory element and increasing the velocity of the scan to high search velocity whenever the scan traverses horizontally beyond the proposed data boundary defined by the information stored in the memory element.

35. The method of claim 34 which further includes the steps of:

(a) In synchronism with the beginning of the slow scan velocity transmitter scan, beginning a receiver scan over a recording medium at the corresponding slow scan velocity;

(b) Maintaining the receiver scan at the slow scan velocity throughout the pass to record document information transmitted to the receiver during the slow scan periods of the transmitter scan;

(c) Suppressing data recording by the facsimile receiver during periods corresponding to periods in which the transmitter scan is scanning at high search velocity over the document;

(d) And resetting the receiver scan to a starting position at the completion of the transmitter scanning pass so as to synchronously begin the next receiver and transmitter scanning passes.

whereby the receiver scan remains in synchronism with and performs recording during the slow scan velocity portion of the transmitter scan and has its data recording suppressed when it loses synchronism during the high search velocity portion of the transmitter scan, both scans being restored in synchronism at the beginning of the next following scan.

36. In a document scanning apparatus for performing a single wide area search pass for detecting presence of data anywhere in a wide band document area composed of a predetermined plurality of vertically successive narrow horizontal bands of predetermined width of the document, said apparatus comprising:

(a) Means for directing at a beginning position of a selected one of the predetermined plurality of successive horizontal bands of the document, a narrow spot of radiation having a spot width approximating the width of a single narrow horizontal band of said document;

(b) Horizontal deflection means for sweeping said spot of radiation across said document in a search pass at a predetermined search velocity;

(c) Modulated vertical deflection means operable during the search pass for rapidly deflecting said spot of radiation up and down vertically across the predetermined plurality of successive narrow horizontal bands to, in combination with said horizontal deflection means, sweep the spot in a sawtoothed vertically reciprocating pass across the predetermined plurality of successive horizontal bands;

whereby the spot of radiation during a single wide search pass, narrowly illuminates any data in any of the predetermined plurality of successive horizontal bands of the document to detect the presence of any such data in the wide band area defined by the predetermined plurality of successive narrow horizontal bands.

37. The scanning apparatus of claim 36, which further includes:

(a) Sensor means responsive to radiation from the illuminated document area for producing a video signal representative of the shade of the document areas scanned by the radiation spot, said video signal having a value greater than a predetermined value whenever data is illuminated during the pass;

(b) Switching means responsive to the video signal for producing a data-presence signal having a value indicating whether or not data has been illuminated during the pass, said switching means being operable for presenting the data-presence signal at the completion of the pass;

(c) Said apparatus having means responsive to the data-presence signal only when it has a value indicating data has not been illuminated during the pass, for performing an additional successive wide search pass of the spot of radiation over an additional successive wide band document area vertically contiguous with the initial wide band area;

whereby successive vertically contiguous data-free wide band areas of the document can be rapidly searched until data is illuminated in one of the wide band areas.

38. The scanning apparatus of claim 37, wherein:

(a) Said scanning apparatus has additional means responsive to the data-presence signal when it has a value indicating data has been illuminated during the pass, for beginning a series of respectively corresponding horizontal passes of the spot of radiation over the same narrow horizontal bands of the wide band area until data is illuminated by the spot of radiation during one of the respective horizontal passes;

whereby the spot of radiation is able during the said horizontal passes to locate and read the data detected during the preceding wide search pass across the wide band area.

39. A facsimile transmitter-receiver employing a predetermined fast search velocity of the transmitter scan for searching a document and a predetermined slow scan velocity of the transmitter scan for reading the document, apparatus for performing a scanning pass across a document and recording data read therein, said apparatus comprising:

(a) Mode control transmitter scanning means for beginning a generally horizontal scanning pass across the document at the slow scan velocity, said transmitter scanning means including velocity selection means for increasing the velocity of the scan to high search velocity when the scan traverses horizontally beyond a horizontal position corresponding to a proposed data boundary between the data containing areas and data-free areas of the document;

(b) Means for generating and transmitting beginning-of-pass synchronizing signals from the transmitter to the receiver synchronously with the beginning of each transmitter pass;

(c) Transmitter video apparatus for forming and transmitting to the receiver video signals representative of data scanned by the transmitter scan during at least its slow scan velocity periods;

(d) Mode control receiver scanning means responsive to said synchronizing signals for beginning a corresponding receiver scanning pass over a recording medium in synchronism with the beginning of the transmitter scanning pass and at a corresponding slow scan velocity, said receiver scanning means maintaining the receiver scan at the slow scan velocity throughout the pass to record data information transmitted to the receiver during the slow scan period of the transmitter scan;

(e) Data recording suppression means for suppressing data recording by the facsimile receiver during periods corresponding to periods in which the transmitter scan is moving at high search velocity over the document;

(f) Said receiver scanning means including receiver synchronizing means responsive to the synchronizing signals transmitted thereto after the completion of the pass to reset the receiver scan to a starting position to synchronously begin the next receiver and transmitter scanning passes;

whereby the receiver scan remains in synchronism with and performs recording during the slow scan velocity portion of the transmitter scan and has its recording suppressed when the receiver scan loses synchronism during the high search velocity portion of the transmitter scan, both scans being restored to synchronism at the beginning of the next following pass.

40. The apparatus of claim 39 wherein said data recording suppression means comprises transmission suppression means for suppressing transmission of data information by the transmitter when the transmitter scan is traversing the document at high search velocity.

41. The transmitter-receiver defined by claim 39 wherein:

said transmitter scanning means includes radiation directing means for directing a narrow spot of radiation at an initial position upon the surface of the document, and further includes horizontal deflection means for initially horizontally deflecting the spot of radiation across the document at the slow scan velocity.

42. The transmitter-receiver of claim 39 wherein:

said transmitter scanning means includes a data position registry means operable during each transmitter pass for registering the position of data elements scanned during the pass and retaining registry of the position of the last data element scanned in the pass during the immediately successive pass; said data position registry means producing during each pass a data position signal representative of the horizontal position defined by the last data element scanned in the immediately preceding pass;

said velocity selection means being coupled to said data position registry means and responsive during the pass to said data position signals for increasing the velocity of the transmitter scan to high search velocity when the scan traverses past a horizontal position corresponding to the position represented by said data position signal;

whereby said transmitter scanning means searches at high horizontal search velocity the proposed horizontally data-free area beyond the position defined by the last data element scanned in the immediately preceding pass to thereby shorten the time required to scan the document.

43. The transmitter-receiver of claim 39 wherein:

said tranmitter scanning means begins the generally horizontal scanning pass across the documents at a predetermined vertical line position of the document and initially scans horizontally across the document at the predetermined line position at the slow scan velocity;

said transmitter scanning means further including vertical deflection means responsive to said data position signal for vertically deflecting the transmitter scan to a vertically successive line position of the document in synchronism with the increase in velocity of the scan;

said transmitter scanning means completing the generally horizontal transmitter pass across the document at the successive line position of the document at the high search velocity, whereby in a single generally horizontal pass, said transmitter scanning means is able to detect the most extreme of the data elements in both an initial line and the successive line of the document to thereby find an extreme proposed data boundary for the next successive pass across the document.

44. The transmitter-receiver apparatus of claim 43 wherein said transmitter scanning means includes data-presence registering means, operable during a pass for registering whether data has been scanned during the pass;

said data-presence registering means being accessible at the completion of the pass for determination of mode selection for the immediately succeeding pass;

said transmitter scanning means being responsive to the data-presence registering means when it registers that data has been traversed by the scan during the horizontal scanning pass for thereafter beginning a successive generally horizontal transmitter scanning pass across the document at the slow scan velocity at the successive line position of the document;

whereby the transmitter scanning means begins its successive transmitter scan at the same line position which was traversed during the high search velocity portion of the preceding generally horizontal transmitter pass.

45. The transmitter-receiver of claim 43 wherein said receiver scanning means maintains the receiver scan throughout its pass at the same vertical line position at which the receiver scan began its pass,
whereby vertical deflection information need not be transmitted to the receiver to reflect deflections of the transmitter scan corresponding to transitions of the transmitter scan to high search velocity.

46. The transmitter-receiver of claim 39 wherein:
said transmitter scanning means includes a data-presence registering means operable during the generally horizontal transmitter scanning pass for registering whether data is read during the pass,
said data-presence registering means being accessible at the completion of the pass for determination of mode selection during the immediately successive pass of the transmitter scanning means.

47. The transmitter-receiver of claim 46 wherein:
said transmitter scanning means is responsive to the data-presence registering means when it registers that no data has been traversed during the generally horizontal transmitter scanning pass, for beginning a successive transmitter pass across the document as a single wide area fast search pass for detecting presence of data anywhere in a wide band document area vertically adjacent the path of the generally horizontal transmitter scanning pass,
said transmitter scanning means including modulated deflection means for both horizontally scanning across the document in a single fast search pass at the predetermined fast search velocity and simultaneously rapidly scanning up and down vertically across the wide band area to scan in a resultant zigzag vertically reciprocating path across the wide band area;
whereby during the single wide fast search pass the transmitter scanning means is able to detect the presence of any data in the wide band area.

48. The transmitter-receiver of claim 47 wherein:
said data presence registering means continues its data-presence registering operation during the single wide fast search pass,
said transmitter scanning means being responsive thereto when the data-presence registering means indicates that no data has been scanned during the wide fast search pass for performing a successive wide fast search pass over a second wide band document area vertically contiguous with the first wide band area;
whereby successive vertically contiguous data-free wide band areas of the document can be rapidly searched and skipped over until data is scanned in one of the wide band areas.

49. In a document scanning apparatus for performing a single wide area fast search pass for detecting presence of data anywhere in a wide band document area composed of a predetermined plurality of vertically successive narrow horizontal bands of predetermined width of the document and scanning any detected data, said apparatus comprising:
(a) Scanning means directable at a beginning position of a selected one of the predetermined plurality of successive horizontal bands of the document, said scanning means having a narrow vertical scanning width approximately the width of a single narrow horizontal band of said document;
(b) Horizontal deflection means for sweeping said scanning means across said document in a search pass at a predetermined search velocity;
(c) Modulated vertical deflection means operable during the search pass for rapidly deflecting said scanning means up and down vertically across the predetermined plurality of successive narrow horizontal bands to, in combination with said horizontal deflection means, sweep the scanning means in a sawtoothed vertically reciprocating pass across the predetermined plurality of successive horizontal bands to detect the presence of any data in the wide band area defined by the predetermined plurality of successive narrow horizontal bands;
(d) Sequencing means operable in response to detection of any data during the signal wide area search pass for thereafter operating said horizontal and vertical deflection means to sweep said scanning means in a series of successive respectively corresponding horizontal passes over each of the narrow horizontal bands of the wide band area until data is scanned during one of the respective horizontal passes.

50. The method of employing a single narrow high resolution scan to first detect any presence of data anywhere in a wide band document area extended in predetermined $x$ and $y$ coordinate directions and composed of a predetermined plurality of successive contiguous narrow rows having predetermined width; and then fully reading any detected data, said method comprising the steps of:
(a) directing a single narrow scan having a scan width approximately equal to the predetermined width, at a selected beginning position of the wide band area and sweeping the scan across the wide band in the $x$ direction in a single fast search pass;
(b) during said single $x$ directed fast search pass, simultaneously rapidly reciprocating the scan up and down in a generally $y$ directed reciprocating path, having many coarsely spaced generally $y$ directed legs, the coarse spacing in the $x$ direction between successive $y$ directed legs being generally substantially wider than the scan width, for high speed sampling of the wide band area to detect any presence of data anywhere in the high band area;
(c) if any data is detected during the single wide fast search pass, thereafter beginning retrace sweeping of the scan in a series of reading passes over each of the rows of the wide band area to fully read with high resolution all data contained therein.

* * * * *